United States Patent
Barada et al.

(10) Patent No.: US 6,330,072 B1
(45) Date of Patent: *Dec. 11, 2001

(54) METHOD AND APPARATUS FOR COMBINING AND ORDERING OBJECTS FROM A PLURALITY OF COLOR PDL FILES REPRESENTING SEPARATIONS TO A DISPLAY LIST OF THE APPROPRIATE ORDER

(75) Inventors: Peter W. Barada, Marblehead, MA (US); Andrew P. Cave; David J. Earl, both of Cambridge (GB)

(73) Assignee: Global Graphics Software Limited (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/821,849

(22) Filed: Mar. 21, 1997

(51) Int. Cl.[7] .................................................. B41B 15/00
(52) U.S. Cl. .......................... 358/1.18; 358/1.9; 345/433
(58) Field of Search .................. 395/117–119, 107–109, 395/112, 114; 382/167; 358/515–518, 1.1–1.18; 345/431–435, 346, 326; 707/528, 517

(56) References Cited

U.S. PATENT DOCUMENTS

| | | | |
|---|---|---|---|
| 4,679,153 | | 7/1987 | Robinson et al. .................. 345/468 |
| 5,029,115 | * | 7/1991 | Geraci .................................. 345/431 |
| 5,467,441 | * | 11/1995 | Stone et al. ........................ 345/433 |
| 5,572,651 | * | 11/1996 | Weber et al. ....................... 345/326 |
| 5,600,768 | * | 2/1997 | Anderson ............................ 345/435 |
| 5,613,046 | * | 3/1997 | Dermer .............................. 395/109 |
| 5,666,543 | * | 9/1997 | Gartland ............................. 707/526 |
| 5,729,704 | * | 3/1998 | Stone et al. ........................ 345/346 |
| 5,926,185 | * | 7/1999 | Vyncke et al. ..................... 345/433 |
| 5,946,451 | * | 8/1999 | Soker ................................... 358/1.9 |

FOREIGN PATENT DOCUMENTS

| | | | |
|---|---|---|---|
| 19513105 A1 | 10/1996 | (DE) | G06K/15/02 |
| 0620534 A1 | 10/1994 | (EP) | G06K/15/00 |
| 96/39683 A1 | 12/1996 | (WO) | G06T/11/00 |

* cited by examiner

Primary Examiner—Leo Boudreau
Assistant Examiner—Ishrat Sherali

(57) ABSTRACT

A method and apparatus for addressing the problem of combining a plurality of Page Description Language (PDL) separation color files to create a display list of objects that represents the composite or combined output image as described by the PDL separation files. Furthermore, any conflicts about the z-order of the display list is resolved by correctly ordering the objects in the display list to the extent that the ordering is significant. The need to produce a display list of objects that represents the composite or combined output image arises from digital preproofing, a technique of proofing and editing the output color image for production from images obtained from a proofing device other than the actual production printer.

14 Claims, 14 Drawing Sheets

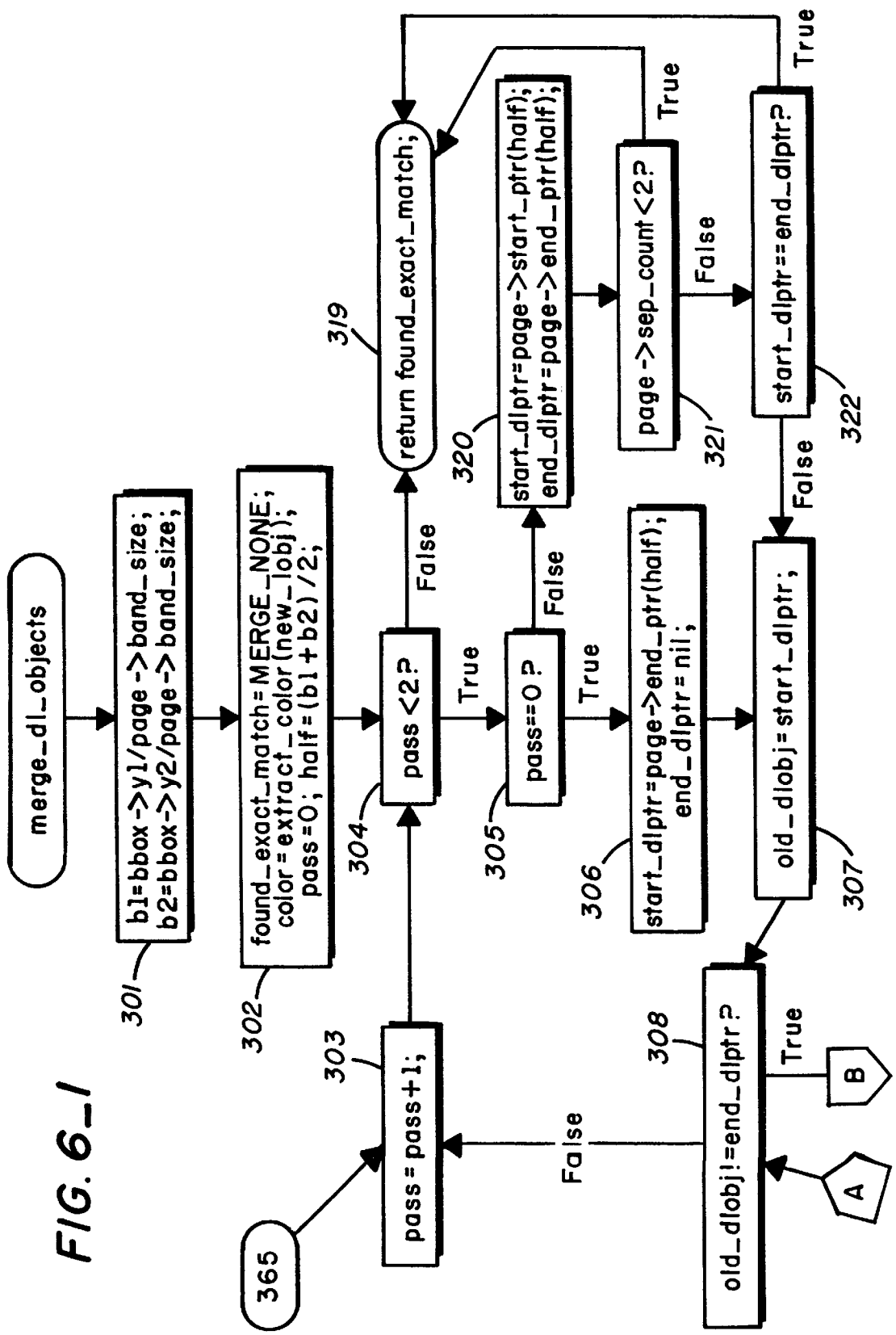
FIG. 6_1

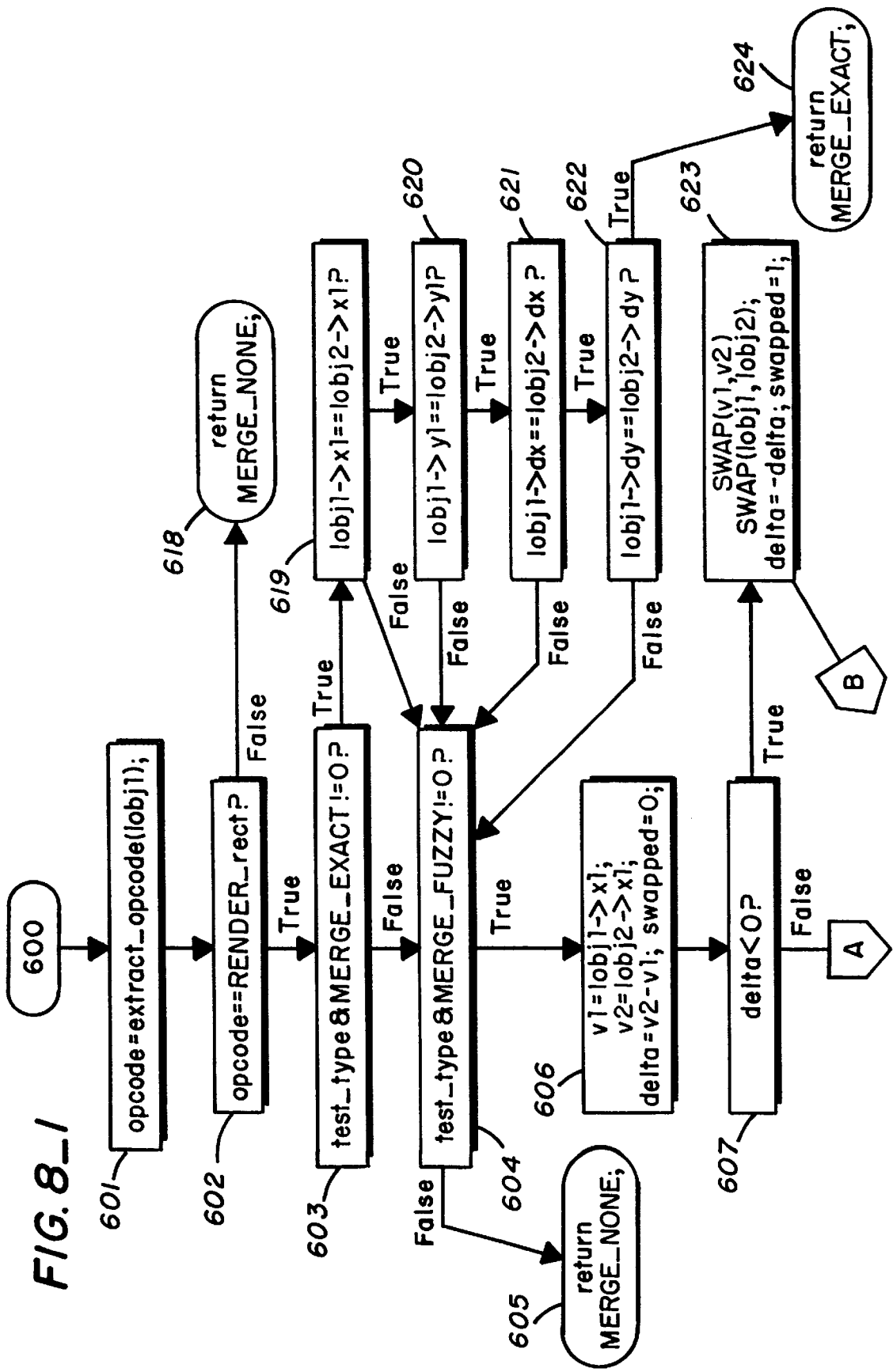
FIG. 8_1

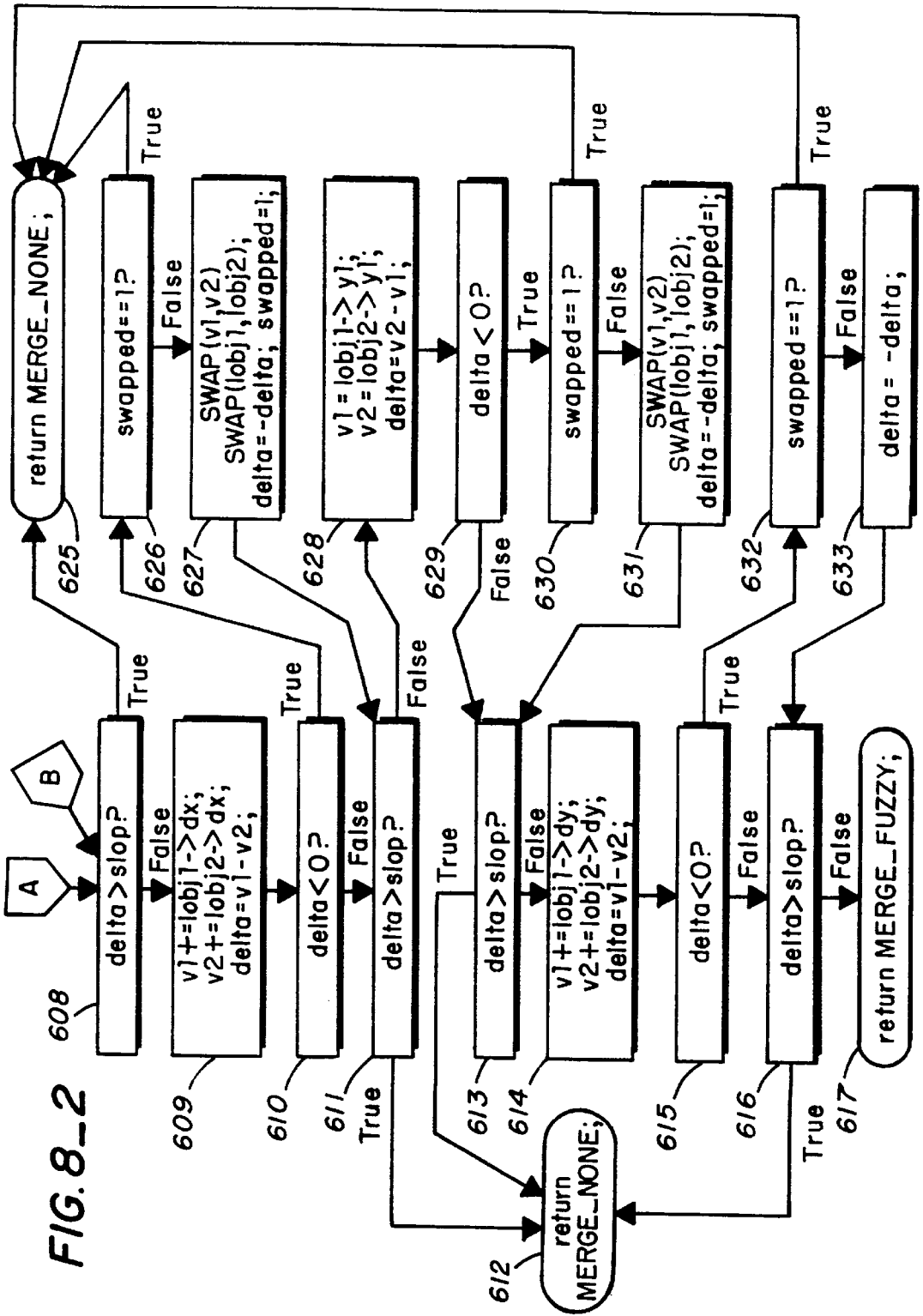
FIG. 8_2

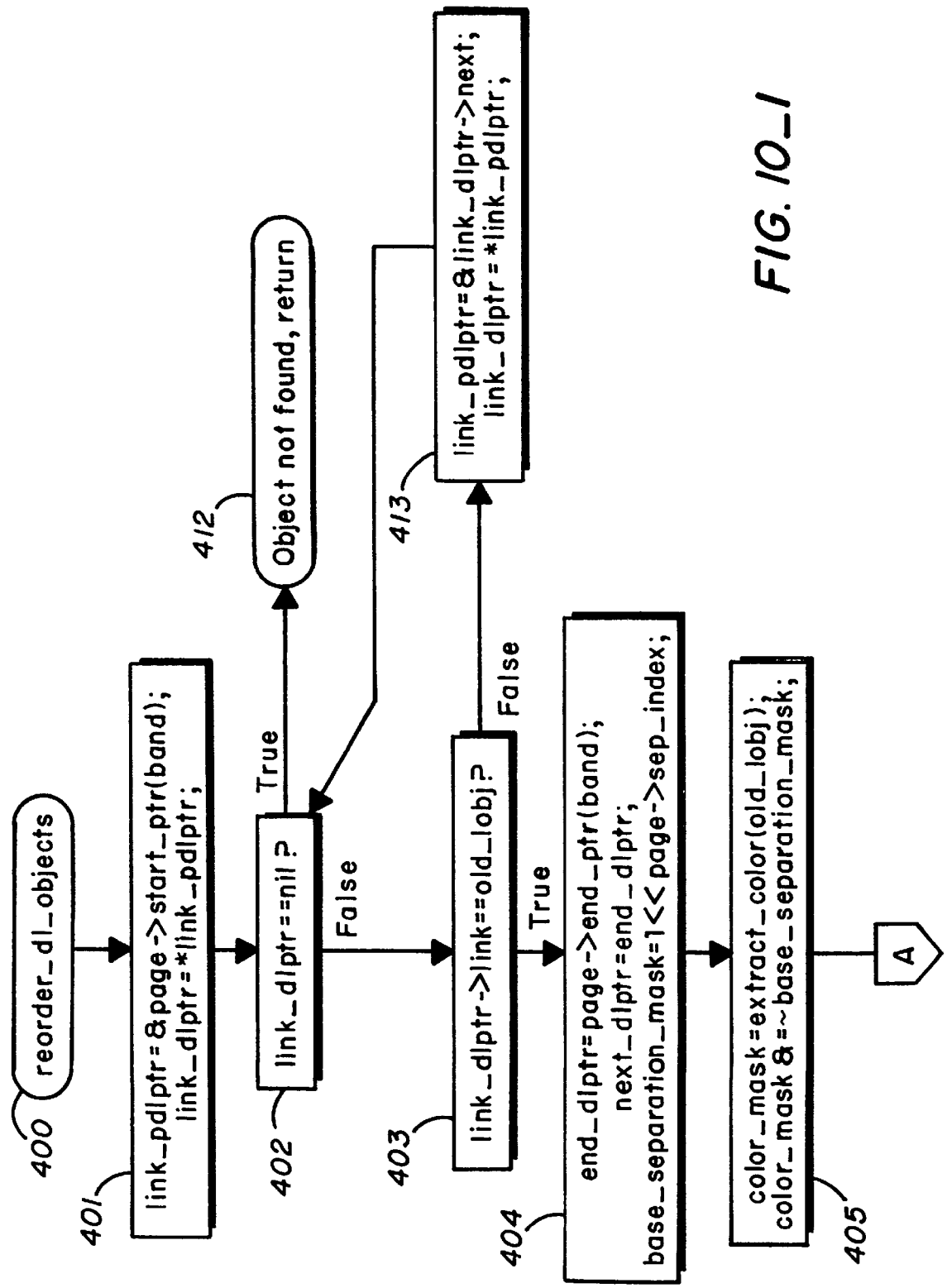
FIG. 10_1

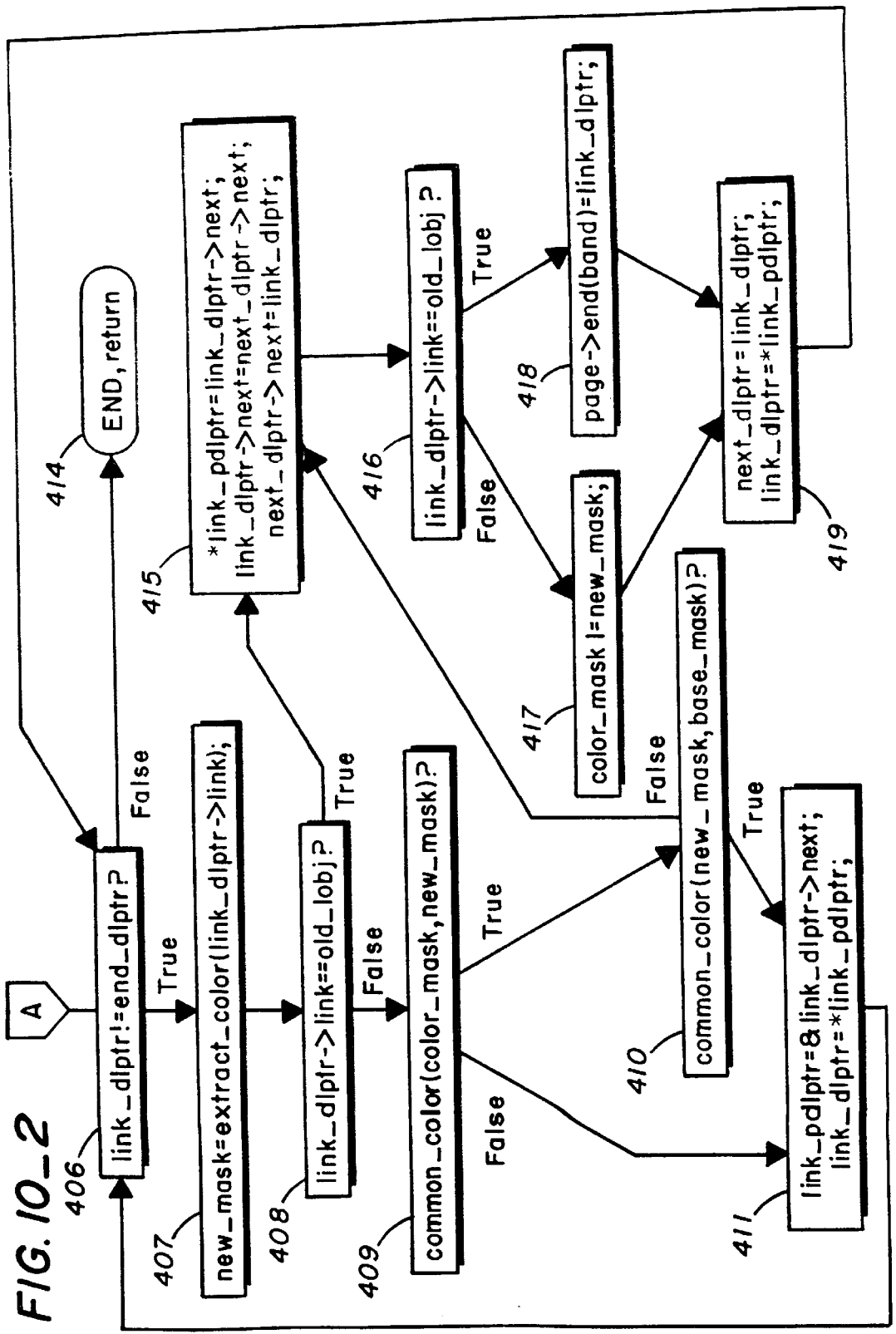
FIG. 10_2

METHOD AND APPARATUS FOR COMBINING AND ORDERING OBJECTS FROM A PLURALITY OF COLOR PDL FILES REPRESENTING SEPARATIONS TO A DISPLAY LIST OF THE APPROPRIATE ORDER

FIELD OF THE INVENTION

The general field of the invention is in electronic printing and publishing. More specifically the invention addresses the problem of combining page description language (PDL) separation files to create a single display list of objects representing the content of the PDL separation files and to correctly order the objects in the display list in a manner consistent with the order described by the PDL separation files.

BACKGROUND OF THE INVENTION

The advent of computers using page description languages (PDL) has had a dramatic impact on the printing and publishing industry. PDLs describe an image in the form of a computer-readable list of geometric, textual, and other visual elements, which are referred to collectively as "objects". PDLs have permitted the wide spread growth of computer-based publishing and printing into traditional printing areas including the manufacturing of high quality process color images.

High quality process color images are normally made on multiple pass color printing systems. There are several different techniques used for multiple pass color printing systems, but most start with a plurality of monochromatic images of the output color image that each hold the percent tint of a single hue, commonly referred to as a separation color or separation. The monochromatic images, which used to consist of black and white images on a photographic film or media, contained all the information about the combination of colors used to make the output color image. In the past, these photographic films were used to produce a plurality of corresponding etched metallic plates which in turn carried the specific single hue or separation for the output color image. The output color image being formed by the multiple printings of the etched plates carrying their various hues or separations.

Multiple pass color printing systems commonly use either a three or four color separation system, with the most common system being the four component cyan, magenta, yellow and black (CMYK) color separation system. However there can be a greater or lesser number of separations depending on the effects in the image that the end-user desires. It is not is uncommon to have 6 to 10 separations for a very high quality output image.

The introduction of PDLs and computer-based printing produced a change in the techniques used in process color printing. Rather than using monochromatic images on photographic films, a plurality of PDL separation files are now used to describe the separations. This change from film to computer-readable files has permitted new changes in the process color print industry that were not available before, such as the ability to quickly alter and edit the shape of an image electronically and the ability to directly etch the metallic plates from the information contained in the PDL separation files.

Furthermore the ability to easily edit and alter the colors in an image in the form of a page description language has also lead the emergence of digital preproofing techniques. In the large volume print industry, digital preproofing techniques save money on production costs by proofing and editing an output color image from proofs obtained from a proofing device other than the actual production printer.

The proofing devices currently in use in digital preproofing systems are usually a combination of a set of color conversion techniques that convert from one separation system to another separation system, such as CMYK to RGB (Red, Green & Blue), and displayed the image from the output from a color printers, or a display on cathode ray tube (CTV) display unit. These color conversion techniques are well-know in the art and are explained by various publications, such as the PostScript® Language Reference Manual, 2nd ed., by Adobe Systems Incorporated, Addison-Wesley Publishing Company (hereinafter referred to as the "RedBook") at Ch.2.2 pp. 12–13.

However, current digital preproofing techniques do not permit the objects described in the PDL separation files to be combined into a single display list of objects for these proofing devices. Furthermore, the move to PDL-based systems also created another problem that did not exist in the traditional film-based techniques. All PDL display lists not only contain information about the visual relationship of the objects to one another in the two dimensions, or x- and y-axis, but also in the foreground to background ordering of objects, or z-axis. Accordingly, the ordering of the objects in a display list, or z-order, becomes critically important in the producing the correct image. For example, if the display list contains objects in the wrong z-order a background object could be erroneously placed too early in the order, with the resulting image having a misplaced background object producing an undesirable visual error in the image that would obscure or overlap foreground objects.

For PDL separation files, the z-order of the objects in the display list creates an additional problem in producing a single "combined" display list. When combining the PDL separation files, problems about the conflicts in object z-orders occur between the different PDL separation files. One of the principal reasons why this problem occurs is that an object will only occur in a PDL separation file if that an object contributes the color that PDL separation file represents. For example, in a CMYK system if the output color image had a blue object, which is a combination of cyan and magenta, the blue object would not be listed as an object in the yellow and black separation files because the blue object does not contribute any color to the yellow and black separations. If the output color image also contained a red object, i.e. a combination of magenta and yellow, and a yellow object, then the PDL separation file representing the magenta would be able to define the order of the red object in relation to the blue object since both objects share the common color of magenta. But the order of the blue object in relation to the yellow object could not be determined from any single PDL separation file as the yellow object and blue object do not share any common separation colors. Nevertheless, the problem of the relative relationship between the blue and yellow objects can be solved by comparing the order of the objects between the different PDL separation files, i.e. the order of the yellow object relative to the blue object can be determined from the order of the blue object to the red object in the "magenta" PDL separation file, and red object to the yellow object in the "yellow" PDL separation file.

SUMMARY OF THE INVENTION

The present invention is a method for combining the objects from a plurality of input PDL separation files that represent a color image to produce a display list of comparable objects that represent the same color image. Furthermore, the present invention resolves any conflicts about the order of the objects in the display list by correctly ordering the objects to the extent that the ordering is significant.

The present invention performs this process by means of a combination of computer-executable functions that obtains as object from an input PDL separation file, compares the object against the current display list of objects and either updates a matching object in the display list with additional data or creates a new object in the existing display list. Furthermore, the invention also establishes if the matching output object is placed too early in the sequence of the order of the display list.

If the matching output object is placed too early in the sequence, the invention orders the list by moving the matching object and any other objects to positions further down the display list to be consistent with the intermediate ordering of the input objects. On the completion of reading and processing all input PDL objects the display list of output objects is processed by a color proofing system to produce the output image.

DETAILED DESCRIPTION OF THE DRAWINGS

FIG. 8 is a detailed flowchart representing a Compare function used for rectangular ListObjects used in a Merge function in a preferred embodiment of the invention.

FIG. 10 is detailed flowcharts representing an Order function used in a Merge function in a preferred embodiment of the invention.

DETAILED DESCRIPTION OF THE INVENTION

The figures refer to a preferred embodiment of the invention as described herein. The figures and description of the preferred embodiment described herein are for the purpose of illustration as any person skilled in the art will readily recognize the possible alternative embodiments from the structures and methodologies described herein. In addition, the preferred embodiment described herein incorporates and utilizes a number of external global functions that are understandable to those versed in the art of implementing page description languages for the electronic publishing industry.

Figure 1:
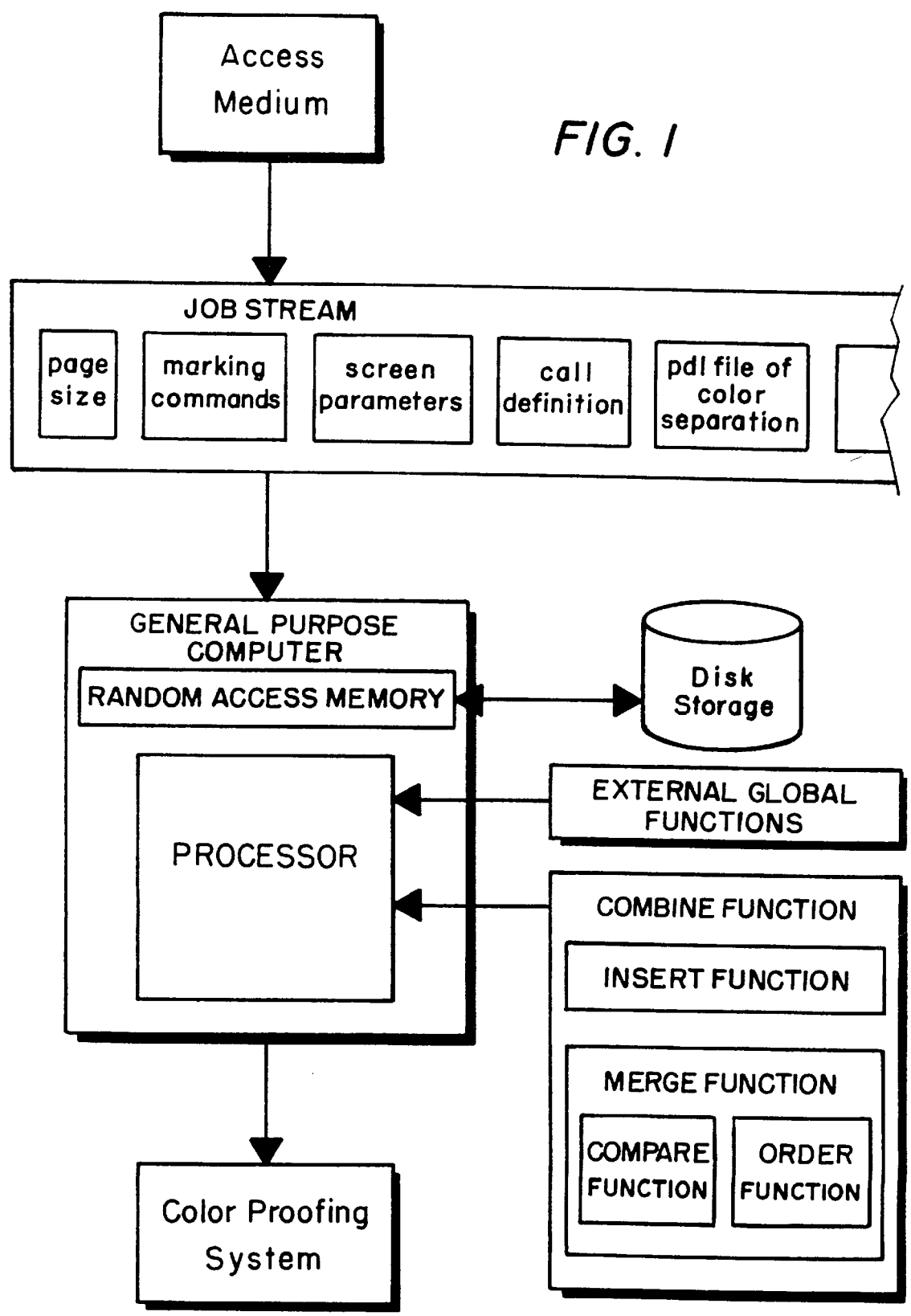
FIG. 1 is a diagram representing the apparatus used in a preferred embodiment of the present invention.

A preferred embodiment of the system as shown in FIG. 1, includes, an access medium for storing and transmitting a plurality of page description language separation files, a general purpose computer containing random access memory (RAM) and a processor to perform functions defined below to generate the display list, and a color proofing system for producing an image from the display list. The access medium can be device or system capable of transmitting digital data, whether it be a network system or storage system such as a disk drive. In a preferred embodiment of the invention the data from the access medium not only consists of a plurality of PDL separation but also other data required to run a large-scale imagesetter, such as page size data, marking commands, color definitions, and screen parameters. The entire data stream is commonly referred to as the jobstream, and contains all the input data required by the multiple pass color printing system to print a multiple pass color output image. In a preferred embodiment the page description languages for the jobstream can be the from of a variety of PDL languages such as PostScript® from Adobe Systems Incorporated or Hewlett-Packard Inc.'s Printer Control Language®, or Graphics Language®.

In processing the jobstream, the general purpose computer produces a Display List, or DL, which the proofing system then receives as the input data it needs to make an output image. The conversion of the DL by color proofing systems is performed by using well-known techniques in the art, such as scan conversion techniques for rending an object on a raster output device that sets the values of the corresponding pixels. This technique of scan conversion is shown in the RedBook at Ch. 6.5, pp. 320–321.

In a preferred embodiment of the present invention as described below the DL consists of a plurality of objects, or ListObjects, that are linked to one another. Each ListObject is uniquely identified by a pointer which points the address of the ListObject in the RAM. There are different types of ListObjects in the DL, and each type of holds different information in the variant portion of the ListObject (referred to as 'the union'). A rectangle-type, or rectangular object, would hold the upper left corner of the rectangle and its extent in the variant portion. A fill-type, or fill object, is a polygon that may have crossing vertices. Accordingly, a fill object would hold the number of vertices, and an array of the vertices of each of the points in the fill. An erase-type, or erase object does not need to hold any information in the variant portion.

Further in a preferred embodiment of the present invention as described below, the Display List orders the ListObjects in a plurality of bands that denote areas of the image where a ListObject marks an area within the band. Within each band is a plurality of pointers, or LinkObjects. Each LinkObject being associated to one ListObject and another LinkObject in the band. Thus, the order of ListObjects within the band, and hence the Display List, is maintained by the order of LinkObjects in the band.

In a preferred embodiment of the invention as described below, the general purpose computer is also reconfigured with external global functions, to convert font characters and objects with curved lines into a series of rectangle-type or fill-type objects before processing by the Combine function. These conversion techniques, which are refer to as flattening, or flattenpath, for flatten the lines on an object to approximate to a curved surface and font conversion, or charpath, for approximating a font character to rectangular and fill objects are well-know in the art and are described in various publications, such as the RedBook at pp. 257–291, 372 and 419.

Another external function called upon by the preferred embodiment described below determines the bounding box, or bbox, of each object. This is described in the RedBook at p.461.

Accordingly, in a preferred embodiment of the invention as described below, the general purpose computer is reconfigured by the Combine function to process converted objects of rectangle, fill and erase types. The syntax and semantics used in the following description to described the Combine function used in a preferred embodiment is a subset directly borrowed from the C programming Language Reference. I refer the reader to any of the many adequate texts describing the syntax of the C language. In the syntax of the C language, a pointer holds the address of a structure or basetype in memory, is written as just a name, for example, ptr. The structure that the pointer points at is written as an asterisk directly preceding the pointer's name, for example, *ptr. Furthermore, as element of a structure that is pointed at by a pointer is written as the name of the pointer followed by the token '→' followed by the name of an element of the structure.

Page Structure

Figure 2:
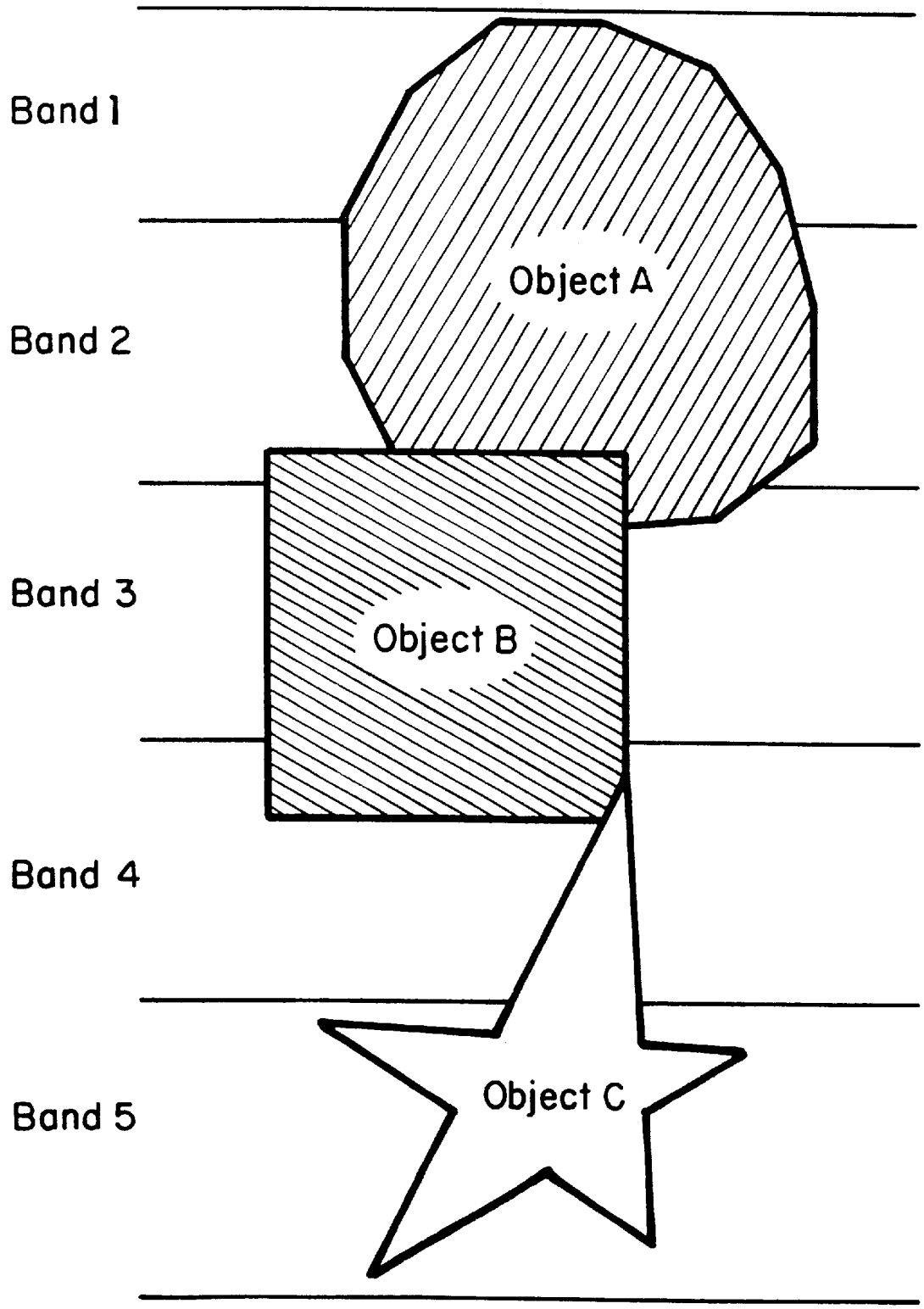
FIG. 2 is an pictorial diagram representing an example of an image and how objects are identified by a preferred embodiment of the present invention.
Figure 3:
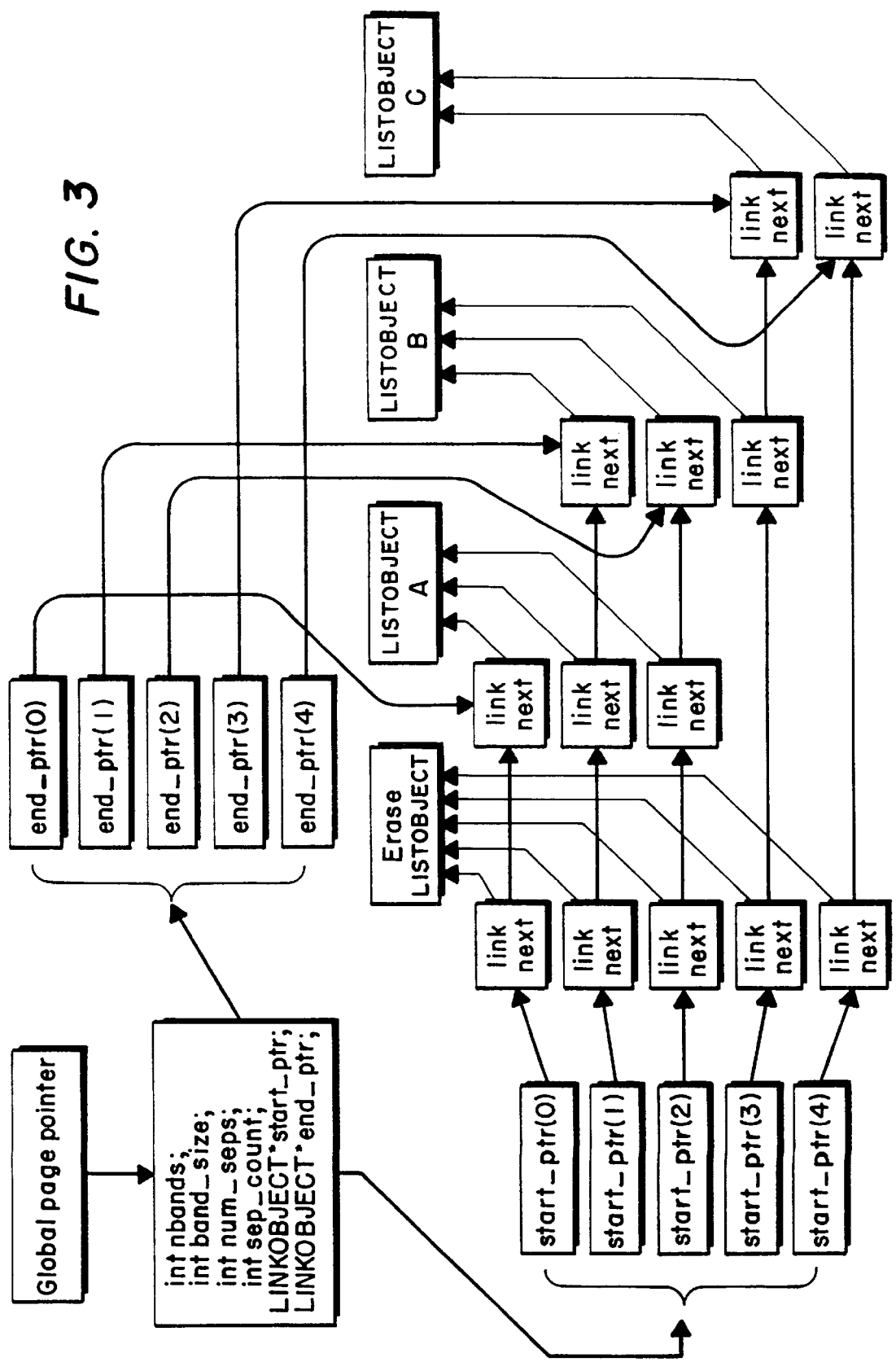
FIG. 3 is an pictorial diagram how a page structure in a preferred embodiment of the invention describes the image represented in FIG. 2.

As shown in the example in FIG. 2, an image consists of plurality of objects. In a preferred embodiment of the present invention the image is described by a page structure that identifies the location and shape of the objects by using a plurality of pointers called LinkObjects that point to locations within horizontal bands on the page. FIG. 3 is a pictorial diagram how the page structure in a preferred embodiment of the invention describes the image represented in FIG. 2.

In the example image in FIG. 2, there are three objects, a circular polygon overlapped by a rectangle which is overlapped by start-shaped polygon, these three objects are respectively A, B, C. Object A marks pixels contained within bands 1, 2, 3 (indexed in the page structure as bands 0, 1, 2), object B marks pixels contained within bands 2, 3, 4 (indexed in the page structure as bands 1, 2, 3), and object C marks pixels contained in band 4 and 5 (indexed in the page structure as bands 3 and 4).

Since object C obscures object B which obscures object A, then object A is temporally before object B, and object B is temporally before object C. Therefore in any band that contains both objects A and B, object A has to be found to precede object B. Also in any band that contains both objects B and C object B has to precede object C.

As shown in FIG. 3 the resulting page structure, which is used in a preferred embodiment of the present invention as described below, consists of 6 pieces of information. The page structure, located by a Global page pointer, includes the number of bands that make up the page (nbands), the number scanlines in each band (band_size), the number of separations defined for the page (num_seps), the number of separations processed thus far (sep_count), and two pointers which point at two arrays of band_size pointers to LinkObjects which contain the first and current LinkObjects for each band. The first LinkObject for each band is called start_ptr and the current LinkObject called end_ptr.

Each LinkObject, as depicted in FIG. 3, and numbered 1 through 13, contains two pointers, a pointer to the next LinkObject in the band (next) which is used to identify the temporal ordering of the band, and a pointer to the ListObject that holds the spatial information of an object to mark (link). Accordingly each band is a linked list of LinkObjects, each pointing to a respective ListObject, with the next pointer of each LinkObject pointing to the next LinkObject in the temporal order and the last LinkObject in the band point to the nil address in RAM to signify that this is the last LinkObject in that band. For the sake of clarity FIG. 3 omits to depict all next pointers that point to the nil address. For example, the next pointer of LinkObject 6 would point to the nil address.

Furthermore, every page structure also contain an erase ListObject which initializes all of the bits in the output raster of the band to be the color of the background color, and the page structure initiates each band with a LinkObject (identified by each start_ptr) that points to this erase ListObject. Accordingly each band starts an Erase LinkObject which points its link pointer at the erase ListObject. In FIG. 3, there are five Erase LinkObjects numbered 1 to 5 inclusive.

For the example in FIG. 2, since Object A is seen first, and it marks pixels in bands 1, 2, 3, the next of the Erase LinkObjects 1, 2 and 3 point to LinkObjects 6, 7 and 8, each of which points its link pointer the ListObject A.

Since ListObject B is next temporal object in the image, and marks pixels in bands 2, 3, 4 the next of LinkObjects 7 and 8 point to LinkObjects 9 and 10, the next of Erase LinkObject 4 points to LinkObject 11, and the link pointers of LinkObjects 9, 10 and 11 point to ListObject B. Also since ListObject B did not mark pixels in band 1, the next of LinkObject 6 points to nil.

Finally, since ListObject C marks pixels in bands 4 and 5, then the next of LinkObject 11, which links to ListObject B in band 4, is set to LinkObject 12, and the Erase LinkObject in band 5 (LinkObject 5) points to LinkObject 13, with the link of LinkObjects 12 and 13 set to ListObject C, and their nexts set to nil.

As a result of using the LinkObjects it can be seen that for any band, the relationship that object B follows object A (as in bands 2, 3) and that object C follows object B (as in band 4) is maintained.

Also depicted in FIG. 3 is the end_ptr array which is used to identified the current object being processed. The end_ptr array is used in the Order function of a preferred embodiment as described below.

ListObject Structure

A ListObject is a structure that holds all of the information about a marking object, the structure of the ListObject used in a preferred embodiment of the present invention for a CMYK separation system is as follows:

```
/* Define a point (x,y pair) */
typedef struct {
    int x, y;
} point;
/* Define a polygon (number of points, and array of points)*/
typedef struct {
    int npoints;
    point points [1];
} fillobject;
typedef enum { RENDER_erase, RENDER_fill, RENDER_rect }
opcode_type;
struct ListObject {
    opcode_type opcode;        /* type erase, fill, rectangle */
    bitfield planes;           /* which colors contribute to the
                                * output color */
```

-continued

```
bitfield marked;        /* which planes are actually marked*/
int x1, y1, dx, dy;     /* rectangle information */
fillobject *fillp;      /* pointer to fill information */
int color [4];          /* the percent tint of each of the
                        /* cyan, magenta, yellow and black
                        /* planes. */
```

}; 'opcode' can be one of three types:

RENDER_erase:
  This completely fills the band to the color specified in 'color'.

RENDER_rect:
  This is a rectangle of color 'color' that has an upper left color at (x1, y1) and is dx pixels wide, and dy pixels high.

RENDER_fill:
  This is a polygon of color 'color'. Since the actual polygon data is variable sized, the structure holding that data is pointed at by 'fillp', which is a fillobject pointer. A fillobject defines 'npoints' which is the number of points that the polygon contains, and an array of 'npoints' points which hold an x,y pair that defines each of the vertices of the polygon.

'planes' holds a bit for each plane of a ListObject that was seen and processed by a Combine function for a CMYK system, bit 0 is for cyan, bit 1 is for magenta, bit 2 is for yellow, and bit 3 is for black.

'marked' holds a bit for each plane of a ListObject that was seen and processed by a Combine function for a CMYK system, bit 0 is for cyan, bit 1 is for magenta, bit 2 is for yellow, and bit 3 is for black. These bits are used by the Combine function to specify which planes the object actually marks in.

There are a number of functions used to extract data from the ListObjects in a preferred embodiment of the invention as shown below:

extract_opcode(lobj):
  Returns the value of 'opcode' of the ListObject pointed at by the parameter passed (lobj). It is equivalent to lobj→opcode.

extract_color(lobj):
  Returns the value of 'planes' of the ListObject pointed at by the parameter passed (lobj). It is equivalent to lobj→planes.

common_color(lobj1, lobj2):
  Returns TRUE if either of the two ListObjects passed in have a common color plane by using a logical AND function for the two objects 'planes' variables, and returning TRUE if the result is non zero, and FALSE if it is zero. It is equivalent to (lobj1→planes & lobj2→planes).

The Combine Function

Figure 4:
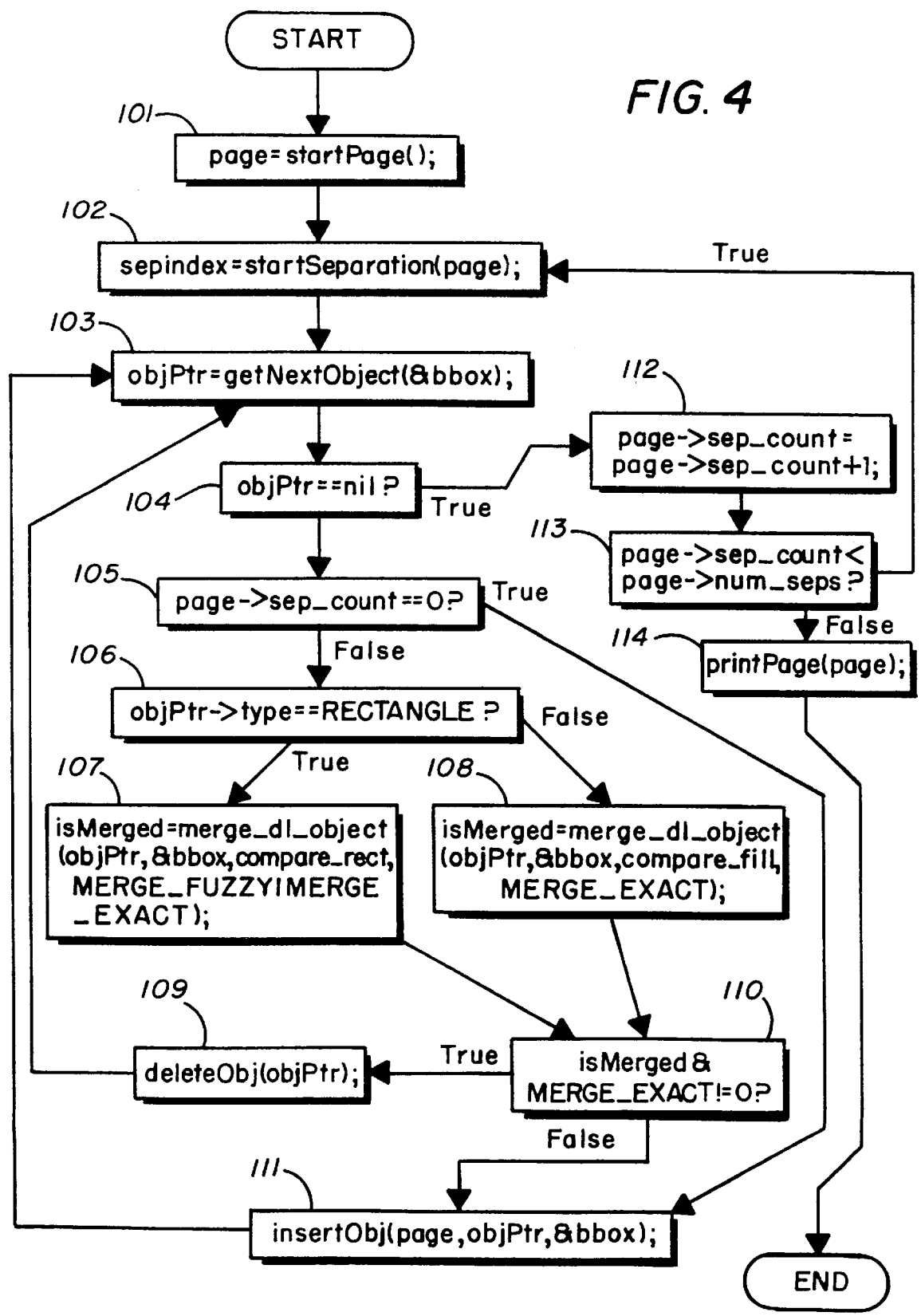
FIG. 4 is a detailed flowchart representing a Combine function used in a preferred embodiment of the invention.

In a preferred embodiment of the present invention the Display List (DL) is created by a function called the Combine function. The Combine function, as depicted in FIG. 4, reads and process the converted input PDL objects until the all input PDL objects from the jobstream are exhausted. The Combine function then passes the DL onto to the proofing system by calling the external function PrintPage (step 114). The mechanics of PrintPage and the rendering of the image from the DL were are well-known to those skilled in the art, which where reference above, and are not pertinent in the construction of a DL.

The Combine function is depicted in the flowchart, Fig.4, and is called for each output image described by the jobstream. Initially the Combine function calls the startpage function that sets the page structure, as described above, to its return (step 101). Accordingly startpage creates the erase ListObject, the number of bands (nbands), the number scanlines in each band (band_size), the number of separations defined for the page (num_seps), the number of separations processed thus far (sep_count), and creates the two pointers which point at two arrays of band_size pointers to those LinkObjects that identify the ListObjects and their temporal relationship between the ListObjects. Finally, startpage creates the Erase LinkObjects for all bands and sets the start (start_ptr) and end (end_ptr) pointers for all of the bands to point at their respective Erase LinkObjects, the link of the Erase LinkObject to point at the Erase ListObject, and the next of the Erase LinkObjects to nil.

Next, at step 102, the Combine function calls the startSeparation function which resets the system to process a new input PDL separation file. The startSeparation function resets all of the end pointers (end_ptr) in the bands to point at the corresponding value of start pointers (start_ptr) for each respective band. This occurs because a new input PDL file is being processed and any new ListObjects to be inserted to the DL will be identified by a LinkObject identified by the next of the LinkObject identified by the end_ptr. Accordingly, end_ptr identifies the position of the last ListObject that was inserted in the DL, and hence the temporal position of that ListObject in relation to the other ListObjects in the DL.

Next, at step 103 the Combine function commences the loop of processing each converted input object by creating a comparable rectangular, fill, or erase object with the appropriate ListObject structure, as defined above, by calling the getNextObject function. The getNextObject function stores the object's bounding box parameter, or bbox, and returns a pointer, objPtr, which points to the address of the ListObject in the RAM. The bounding box parameter, bbox, is needed to determine the extent of bands that marked by the ListObject.

If the getNextObject function has reached the end of the current input PDL separation file, it will set objPtr to the nil address to indicate that the input PDL separation file has been processed. The Combine function checks the value to objPtr to determine if it is nil (step 104).

If objPtr is not nil, the Combine function then determines if the sep_count is zero (step 105), i.e. if *objPtr is from the first input PDL separation file. If is it *objPtr is inserted into the DL by calling the Insert function (step 111) since no other separations have been previously processed.

If the separation count is not zero (step 105), then it is necessary to call the Merge function, or merge_dl_object, to process *objPtr. However, in a preferred embodiment of the present invention, prior to calling the Merge function, the Combine function determines if *objPtr is a rectangular or fill object (step 106).

If *objPtr is a rectangle type, the Combine function calls the Merge function, or merge_dl_object, to set the value of the variable isMerged with the inputs of objPtr, bbox, the Compare Rectangle function, and the test_type for both a fuzzy and exact match (step 107).

If *objPtr is a not a rectangle type, i.e. it is a fill type, the Combine function calls the Merge function, or merge_dl_object, to set the value of the variable isMerged with the inputs of objPtr, bbox, the Compare Fill function, and a test_type for an exact match (step 108).

In a preferred embodiment of the present invention, not only does the Merge function set the value of the variable isMerged, it also compares *objPtr with the ListObjects in the DL, merges the *objPtr with a matching ListObject in the DL if one is found, and orders the ListObjects in the DL if the matching ListObject is found to be incorrectly placed in its temporal order in the DL. Furthermore, the Compare function called within the Merge function is compare_rect if the *objPtr is a rectangle object, and is compare_fill it is a fill object. Also the test_type passed into the Merge function, or merge_dl_objects, differs depending on the type of ListObject. There are two different test_types when combining, one is an exact match, and the other is a fuzzy match. An exact match will result in the object being merged with the matching ListObject. A fuzzy match will keep the two objects, *objPtr and the fuzzy matching ListObject, as separate objects but will exchange the two object's bitfield planes. A fuzzy match is required if preapplied traps have been added to input PDL objects.

A trap will 'spread' the yellow parts of an object out, i.e. make them larger, to allow for more relaxed registration. For example, a "trapped" green rectangle (cyan+yellow) will have a cyan rectangle and a yellow rectangle that encompasses the cyan rectangle by a few pixels (referred to as 'slop') so if the separations moves around due to bad registration, the darker cyan rectangle will not peak out from under the yellow rectangle. If a match was found, either exact or fuzzy, then its corresponding test bit is removed from test_type, so it is not looked for again, and that bit is set in the found_exact_match variable which is eventually returned to the Combine function as the value, isMerged.

After calling the Merge function and processing *objPtr accordingly, the Combine function then determines whether the returned value for isMerged from either step 107 or step 108 is such that the MERGE_EXACT bit is returned from the Merge function, i.e. isMerged contains MERGE_EXACT (step 110).

If true, then a matching ListObject was found in the DL, so *objPtr is not needed, and it is recycled back into the heap by calling the deleteObj function (step 109) and returning to step 103 to process the next object.

If false, then a matching ListObject was not found, so *objPtr is inserted into the DL as a new ListObject by calling Insert function and passing to it the values objPtr and bbox (step 111).

In either case, both step 109 or 111 of the Combine function completes the loop by returning to step 103 and calling the getNextObject to find the next object from the current converted input PDL separation file.

As mentioned above, if in processing the current separation the objPtr is nil (step 104) the current input PDL separation file has been processed, so the Combine function increments the value of sep_count by one (step 112) and checks to see if all of the separations have been processed by determining comparing sep_count against num_seps (step 114). If additional input PDL separation files need to be processed the Combine function resets the end_ptrs by calling the startSeparation function (step 102), otherwise it calls the printPage function to pass the DL onto the color proofing system.

The Insert Function

Figure 5:
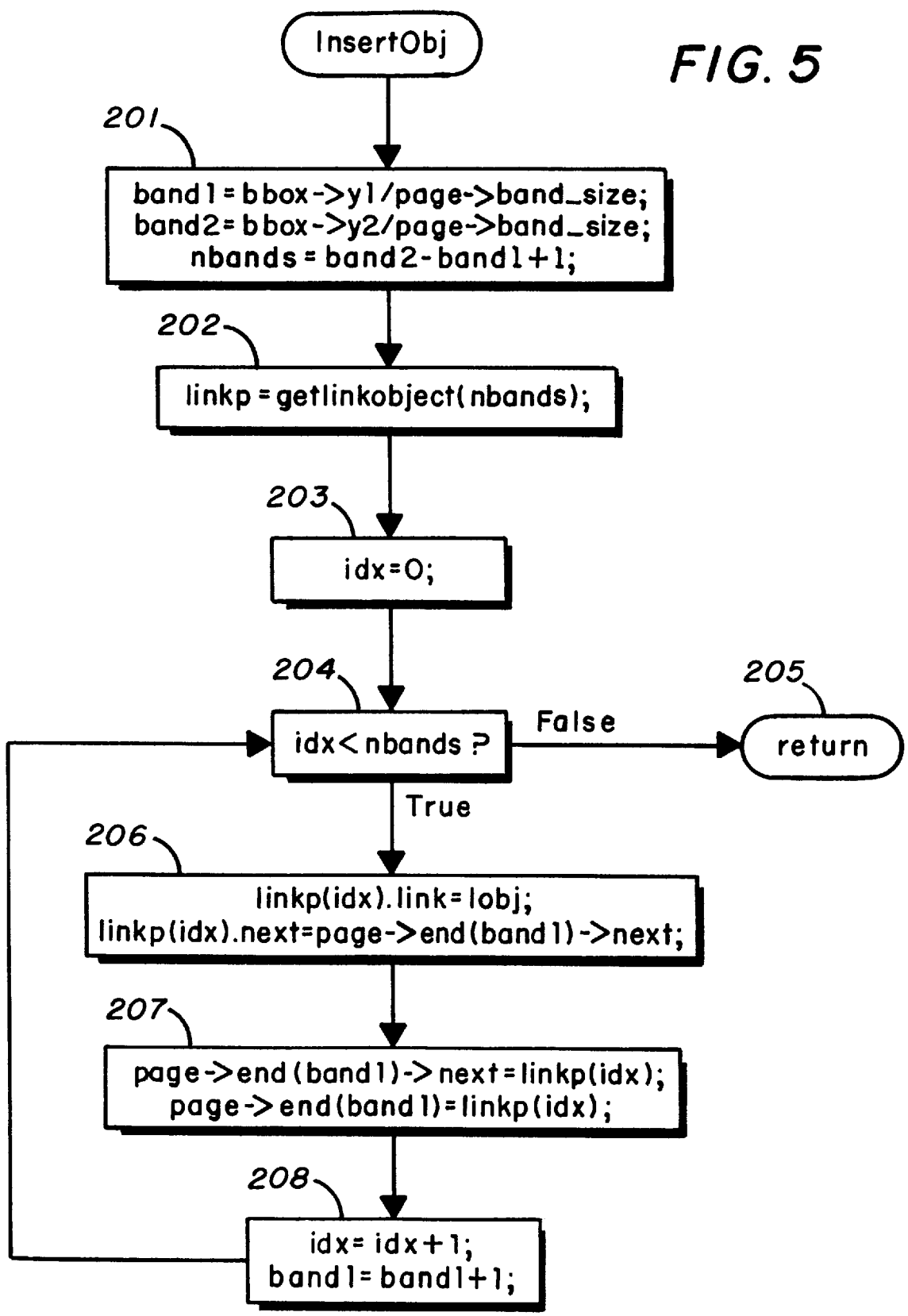
FIG. 5 is a detailed flowchart representing an Insert function used in a Combine function in a preferred embodiment of the invention.

As identified in step 111 of the Combine function, and described in FIG. 5, the Insert function, or insertObj, is called to insert a ListObject into the DL. The function input is passed the pointer to the object, objPtr, which holds the data in the ListObject Structure, and the bounding box of the object, bbox. In a preferred embodiment of the present invention, as depicted in FIG. 5, a pointer lobj is set to point to the same address as objPtr.

At step 201 the Insert function determines the value of the integer variable, nbands, that represents the number of bands, or band extent, the object covers. Step 201 performs this by first calculating the integer variables band1 and band2 which represent the lowest and highest band that the object covers. The integers band1 and band2 are calculated from bbox which defines the lowest and highest scanlines of the bounding box for the object. The lower bbox y-value (bbox→y1) is divided by the number of scanlines in a band (page→band_size) and then truncated to assign the value to band1.

For example, if band_size was 100, and lower bbox, or y1, was 150 (i.e. the 150th scanline in the page) then band1 would be truncation of the y1 value divided by band_size, or the truncation of 150 divided by 100, which equals 1.

The same process is repeated for the highest band (bbox→y2) that the object is on to determine band2. For example if y2 was 459, then band2 would be the truncation of 459 divided by 100, or 4. The value of nbands is then determined by subtracting the value of band1 from band2 and adding one. For the example above nbands would equal band2 minus band1 plus one, or (4−1)+=4. Accordingly step 201 determines the values for the low and high band that the ListObject, lobj, covers and the number of bands that the ListObject straddles, or the band extent of the ListObject.

At step 202, the Insert function calls the getLinkObject function with the value of nbands. As the value of nbands is also the number of LinkObjects needed to point at the ListObject, getLinkObject allocates enough memory in RAM to hold an array, linkp, which contains nband number of LinkObjects. For example for the above the array linkp would have four LinkObjects.

After setting up the array linkp, the Insert function sets up a loop to process each LinkObject in the array. At Step 203 an integer count variable, idx, is set to 0, and the loop between step 204 and 208 repeating the loop until idx equals nbands (step 204).

The loop from step 204 to step 208 in FIG. 5 first sets the link of linkp[idx] to point at the ListObject that is being inserted, *lobj (step 206).

Then at step 206, the linkp[idx] is inserted into the page structure by moving three pointers. First, the next of linkp[idx] is set to the next of the LinkObject currently pointed at by the appropriate end_ptr, page→end_ptr next. The appropriate end_ptr for the first linkp to be processed, linkp[0], is the end_ptr for the lowest band, i.e. page→end_ptr[band1]. After completing the insertion of linkp[0] into band1, both idx and band1 are incremented by one (step 208) thereby moving the next linkp to the next band, i.e. linkp[1] will be inserted into the band[band1+1]. Second, page→end_ptr[band1]next is set to point to the address of the linkp[idx]. Finally end_ptr[band1] is set to point at linkp[idx] (step 207). This ensures that the end_ptrs for each band covered by the ListObject point at the LinkObjects that point to the ListObject, accordingly the end_ptr for each band will always reference the LinkObject that points to last ListObject added to its band.

After processing each linkp and placing it in the appropriate band the Insert function terminates at step 204 when idx is equal to the number of bands the ListObject covers, or nbands.

The Merge Function

Figures 2, 6:
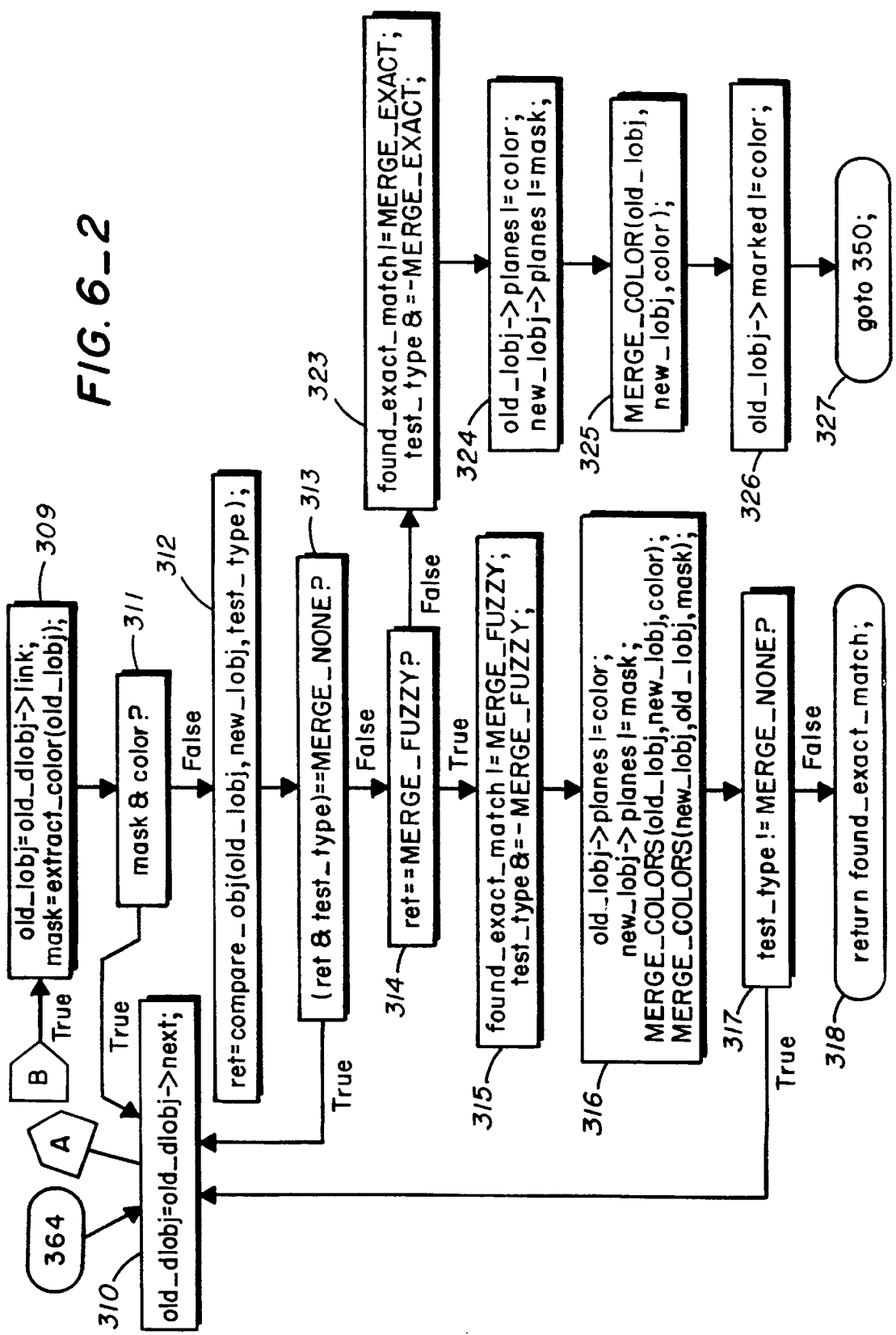
FIGS. 6 and 7 are detailed flowcharts representing a Merge function used in a Combine function in a preferred embodiment of the invention.
Figure 7:
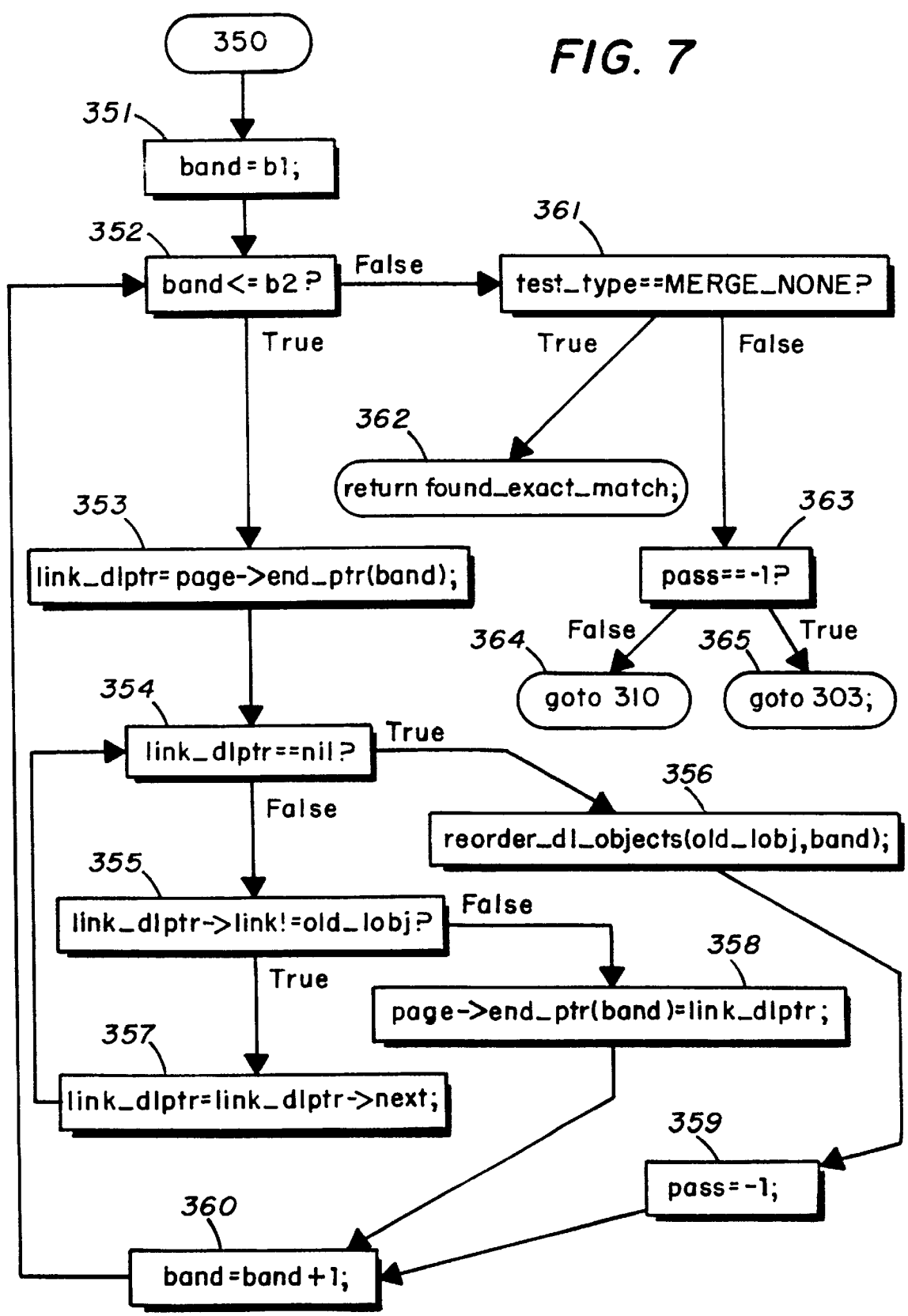
Figure 9:
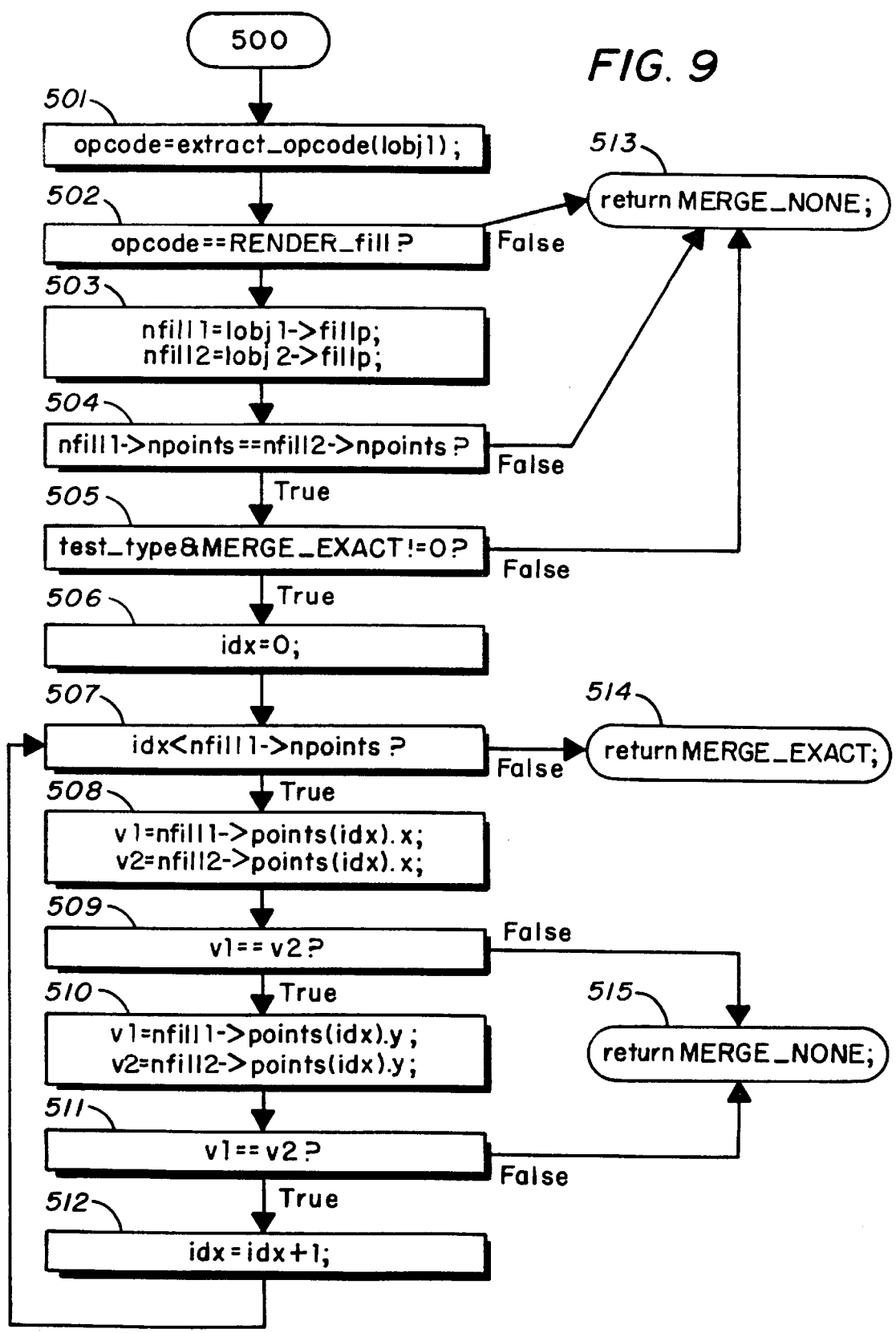
FIG. 9 is a detailed flowchart representing a Compare function used for fill ListObjects in a Merge function in a preferred embodiment of the invention.

As depicted in FIG. 6 and 7 the Merge function, or merge_dl_object function, attempts to find a ListObject within the display list that matches the ListObject being processed, as identified by the pointer new_lobj that is set to objPtr and *objPtr's bounding box, bbox, and calls on a compare function, compare_func, to compare the *new_lobj against the ListObjects in the middle band that *new_lobj straddles.

In processing *objPtr the Merge function returns one of four values for the found_exact_match, which is isMerged in the Combine function:

MERGE_NONE—the object was not found in the band.
MERGE_FUZZY—an approximate match was found in the band.
MERGE_EXACT—an exact match was found in the band.
MERGE_EXACT|MERGE_FUZZY—both and exact match and an approximate match was found in the band.

The Merge function commences at step 301 in FIG. 6 by determining which bands *new_lobj is listed in. As explained in the Insert Function section above, this is done by taking the y positions from the bounding box (bbox) and dividing them by the number of scan lines in a band. This gives band b1 and b2 where b1 is the upper band, and b2 is the lower band.

Next the color mask is extracted from new_lobj, this color mask being the color of the current separation, the variable found_exact_match is initialized to MERGE_NONE, the middle band that the ListObject covers, band [half], is determined by the integer variable half that is calculated by truncating (b1+b2)/2, and the variable pass is set to 0 (step 302).

The pass variable is used to determine which part of the search is being conducted as there are two passes made within the LinkObjects that exist in band with the band [half]. If the pass variable is zero, then the first pass starts from the end pointer of the band, end_ptr[half], to the end of the band, identified by LinkObject in band[half] with the next pointing to nil address in RAM. The first pass starts at end_ptr[half] because this is the place where the last ListObject was added to band, and if a matching ListObject is identified between end_ptr[half] and the last LinkObject in band[half] then the matching ListObject is not out of order and there is no need to call the Order function. If pass is 1, then the second pass is executed to start from the start pointer of the band, start_ptr[half], to the end pointer of the band, end_ptr[half]. If an exact match is found in the second pass then the matching ListObject is out of order and the Order function is called.

Step 304 checks if the pass state variable is less than two, if it is not then both passes have been completed and value of found_exact_match is returned to the Combine function (step 319). If pass is less than two, pass is check to see if the first pass has been performed (step 305).

If it is the first pass then the Merge function sets the pointer start_dlptr to equal end_ptr_[half] and end_dlptr the LinkObject in band[half] with the next pointing to nil (step 306).

If it is the second pass, then start_dlptr is set to start_ptr[half], and end_dlptr to end_ptr[half] (step 320).

However, before processing the second pass the separation count (sep_count) is checked to see if it is less than two (step 321).

If sep_count is less than two the LinkObjects can not be out of order relative to each other since, as explained above, at least three separations are needed to find an out of order ListObject.

Accordingly the Merge function returns the value of found_exact_match to the Compare function (step 319).

If the separation count is two or greater, then it is checked to see if start_dlptr is equal to end_dlptr (step 322), and if so the value of found_exact_match is returned (step 321). This is a addition step is used as shortcut for the path of step 322→307→308→303→304→319.

Having set start_dlptr and end_dlptr for either the first pass (step 306) or the second pass (step 322), step 307 is sets the pointer old_dlobj to start_dlptr, and the loop starting at step 308 by moving old_dlobj down the linked list of LinkObjects from start_dlptr to end_dlptr. When old_dlobj is equal to end_dlptr, then the pass is complete (step 308).

If old_dlobj is not equal to end_dlptr (step 308), then the old_lobj is set to the ListObject pointed at by the link identified by old_dlobj and the color array, mask, to the color array of the *old_lobj by the extract_color function (step 309). Step 311 determines if mask has any colors common in with new_lobj, that is the color of the current separation. If so then this ListObject has been processed for the current separation and the process moves to the next ListObject identified by the next LinkObject.

The Merge function then calls the Compare function passed into it with the old_lobj, new lobj and the requested test type (step 312). As stated in the Combine function, there are two types of Compare function depending on whether the ListObject, as identified by new_lobj, is a rectangle or fill type object.

If the result of the Compare function is MERGE_NONE, then the ListObjects being compared are not even approximately equal, much less equivalent (step 313). Accordingly old_dlobj is moved to the next ListObject identified by the appropriate LinkObject (step 310).

If the return of the Compare function is not MERGE_NONE then Merge function checks to determine if the return is a fuzzy merge (step 314), and if so, the value MERGE_FUZZY is set to found_exact_match and the procedure for a fuzzy merge is removed from the test_type (step 315).

For any fuzzy merge, which can only occur between rectangle type ListObjects in a preferred embodiment of the present invention the colors between the two ListObjects are shared. So fuzzy matches maintains both objects and shares their colors, but not their markings. Accordingly a ListObject can mark in cyan, but have fuzzy matches in any or all other planes. This allows the output color generator to determine which colors actually contribute to the output color, and only marking the plane that the object was defined in.

Since new_lobj only has the percent tint of the current separation, the other separations color of new_lobj need to be set those in old_lobj, and the current separation color of new_lobj to the color in old_lobj (step 316). Note that for fuzzy merges, new_lobj and old_lobj end up with the same colors in the ListObjects, but their marked bits are not the same.

At step 316 the MERGE_COLORS macro performs the merging of the colors by taking a source ListObject, a destination ListObject and a color mask (an array representing up to sixteen colors, 0 to 15). The plurality of colors in the destination ListObject for the corresponding bits in the color mask are set to the color in the corresponding color in the source ListObject. For example, if the color mask is cyan, then the destination's ListObject cyan color is set the cyan color of the source ListObject. If the color mask is magenta and yellow, then the destination's magenta color is set the source magenta color, and the destination's yellow color is set the source yellow color.

If the return for the test_type is still is non-zero (step 317), this means an exact match not was found, the old_dlobj is moved to the next LinkObject in the band and continue looking for an object that matches new_lobj in the band (step 310→308).

If at step 317 the return from test_type was MERGE_NONE, then a matching ListObject and the value for found_exact_match (which is MERGE_EXACT|MERGE_FUZZY at this point) is returned to the Combine function (step 318).

If at step 314, the return from the Compare function was an exact match then set the MERGE_EXACT bit in found_exact_match, and the MERGE_EXACT test bit is removed from the test type (step 323).

The current separation color in old_lobj is then set to that which is in new_lobj (step 325). Since the MERGE_EXACT bit is now set in found_exact_match, new_lobj will be disposed of since it is not needed any more, so there is no point setting the other separation colors of new_lobj to those in old_lobj.

The marked bit of the old_lobj is set since it is now known that that object will be marking in the current separation (step 326).

The end_ptr for each band needs to be moved to point at the LinkObjects with links pointing to old_lobj. Accordingly, at FIG. 7, starting at band b1 (step 351) the Merge Function begins to reset all the appropriate end_ptrs, as the merging of new_lobj and old_lobj is the most recent addition of a ListObject to the Display List.

At step 352 if the current band is less than then ending band, b2, then the band has to be searched for ListObject old_lobj. link_dlptr is set to the end_ptr[band] (step 353), and the loop looking for old_lobj in the band begins.

If link_dlptr is nil (step 354), then old_lobj must exist somewhere between start_ptr[band] and end_ptr[band]. This means that the ListObject old_lobj is out of order and the Order function needs to be called to order the LinkObjects within the band (step 356). After the Order function is called the pass value is set to −1 (step 359) since objects have moved in the band, the search for a fuzzy match has to restart (via step 365). The merge function moves onto to the next band (step 360).

If the link of link_dlptr is not nil (step 354) then it is checked if it equals old_lobj (step 355). If it is not, then set link_dlptr to the next LinkObject in the band (step 357), and continue the loop.

If the ListObject that page→link_dlptr.link points at is old_lobj (step 355) then set the page→end_ptr[band] to point at the link_dlptr (step 358) and move to the next band (step 360), and continue looking through all the bands until they have all been searched.

When all of the bands have been searched, i.e. band is greater than b2 (step 352) see if test type is MERGE_NONE. If it is, return the value of found_exact_match (step 362) to the Combine function. If not, then test_type is MERGE_FUZZY, and see if pass is −1, which was set in step 359 to indicate that a band was out of order, and if so the fuzzy match will be performed (via step 363→365→303), start on the next pass (which will be zero) and search again for fuzzy matches (since MERGE_EXACT was stripped from test_type by step 323). If pass is not −1, then this object is not out of order in the band, so Merge function returns to step 310 to continue its search for a fuzzy match (step 363→364→310).

The reason why the continued search for a fuzzy match after an exact match is found is because if a ListObject is found to be out of order in the middle band of its extent, then the LinkObject found to be out of order is rearranged by the Order function rather than the out-of-order matching ListObject. Accordingly, one of the objects moved by the Order function could be the fuzzy match ListObject. The new search for a fuzzy match is needed to search for any objects following the out-of-order ListObjects that were moved by the Order function.

The Compare Function—Rectangular Objects

As depicted in FIG. 8, the Compare function for rectangular objects, or compare_rectangle_objects(lobj1, lobj2, test_type), which is called by the Merge function, is one of the two compare functions in a preferred embodiment of the present invention that takes two ListObject records pointed at by lobj1, lobj2, and returns one of three values to the Merge function:

MERGE_NONE—either lobj1 is not a rectangle, or if an exact match was only requested, if the two rectangles do not match, or if a fuzzy match was requested and neither rectangle encloses the other within 'slop' pixels.

MERGE_EXACT—if an exact match was requested (setting the MERGE_EXACT bit in test_type), and lobj1 is a rectangle and the two objects have the same starting points (x1, y1), and have matching width and height (dx,dy).

MERGE_FUZZY—if a fuzzy match was requested (setting the MERGE_FUZZY bit in test_type), and if an exact match was requested it failed, and either lobj1 encloses lobj2 within 'slop' pixels, or lobj2 encloses lobj1 within 'slop' pixels. In a preferred embodiment of the present invention, as shown in FIG. 8, the Compare function (Rectangle) first determines that if lobj1 is not a rectangle, then it returns MERGE_NONE (step 601 to 618). If an exact match was requested, it is worked on first since both match types are requested (setting both MERGE_EXACT and MERGE_FUZZY in test-type) and the exact match has precedence. The two rectangles are determined to be the same if they have the same starting x (step 619), the same starting y (step 620), and the width and height are the same (step 621). If all of the above conditions are met then MERGE_EXACT is returned (step 623). If any of the four preceding conditions are false, the Compare function to look to see if a fuzzy match is requested (step 604). If not, it returns MERGE_NONE (step 605).

Fuzzy matches are done by assuming that lobj1 encloses lobj2, and calculating the delta between the x1 positions (step 606). The swapped variable is used to prevent the code from trying to swap he boxes twice. If the delta is less than zero (step 607), then lobj2 is trying to enclose lobj1, so the variables lobj1 and lobj2 and v1 and v2 are swapped resulting in the delta being made positive. To establish that the variable have been swapped, the swapped variable is set to 1 (step 624).

If at this point delta is greater than slop (step 608), then the two rectangles starting x position are not within slop pixels of each other and MERGE_NONE is returned (step 625).

If the starting x positions are within slop of each other, the same is repeated with the ending x positions (step 609) by adding the delta x of each rectangle to the variables v1, v2 which were set to the starting positions (step 606) and may have been swapped (step 623). Again delta is calculated (step 623) to see if it is less than zero (step 610). If delta is less than zero then lobj2 is trying to enclose lobj1 on the right side. Remember that if it was found on the left side that lobj2 started left of lobj1 (step 607), then lobj1 and lobj2 were swapped along with v1 and v2 (step 623) to make lobj1 be 'left' of lobj2. So at this point if swapped is 1 (step 626), then it is known that in x lobj1 has both its starting x and ending x left of lobj2, or both its starting x and ending x right of lobj2, which means that lobj1 does not enclose lobj2 or vice-versa. Accordingly the return is MERGE_NONE (step 625).

If delta is not less than zero (step 610), it is checked that it too is within slop (step 611), and if not, MERGE_NONE is returned (step 612) since the two rectangles are not within slop pixels of enclosing each other.

If delta was less than zero and swapped was not 1 (step 610→626→627) then swap lobj1 and lobj2, and v1 and v2 and negate delta since this is the first time they are swapped (since the left edge did not cause a swap) so the value of swapped ends up being 1 (step 626).

If the objects are swapped and the delta is too large for swap (steps 610→625→627→611) and the delta is larger than slop, then the two rectangles can not enclose each other (steps 611) and return MERGE_NONE (step 612)

If delta is less than slop (step 611→628), then the left edge of the rectangle defined by lobj1 is left of the left edge of the rectangle defined by lobj2 within slop pixels, and that the right edge of lobj1 is right of the right edge of the rectangle defined by lobj2 within slop pixels. Accordingly, the process is repeated to looking at the y enclosing values.

The delta of the y starting value of the two rectangles is computed first (step 628), and if delta is not less than zero and greater than slop, MERGE_NONE is return since it can not be a fuzzy match (step 629→613→612). If delta is less than 0 and swapped is 1, then again it can not be a fuzzy match (step 629→630→625).

If delta is less than 0, and the ListObjects have not been swapped, then the Compare function swaps the ListObjects (step 631).

If the delta was negative, swapped was 0, the values were swapped (step 629→630→631) check that the delta is not larger than slop (613). If so, return MERGE_NONE (step 612) since again neither rectangle encloses the other within slop.

If delta is less than slop, then the lower y end of the rectangle is processed since so far appears that lobj1 contains lobj2. Calculate the delta between the lower edges in y (step 614) and see if it is less than 0 (step 615). If so lobj2 is trying to enclose lobj1. If the two objects have been swapped (checked at step 632) then lobj2 is trying to enclose lobj1 after we found out previously that lobj1 was trying to enclose lobj2. In this case MERGE_NONE is returned (step 625).

If delta was found negative, and the two rectangles have not been swapped, negate delta (step 615→632→633→616) and check if delta is within slop (step 616). If not, return MERGE_NONE (step 612) since the two rectangles can not enclose each other within slop. If delta is less than slop (step 616→617) return MERGE_FUZZY since at this point it is know that one of the rectangles encloses the other within slop pixels.

The Compare Function—Fill ListObjects

The Compare function for fill ListObjects, or compare_fill_objects( lobj1, lobj2, test_type), is the other compare function of a preferred embodiment of the present invention, taking the ListObject records pointed at by lobj1, lobj2, and returning one of two values to the Merge function:

MERGE_EXACT—lobj1 is a fill object, an exact match is requested(by setting the MERGE_EXACT bit in test_type), the number of vertices in lobj1 matches those in lobj2, and for each successive vertex in lobj1, lobj2 they match.

MERGE_NONE—in any other case.

The function first determines if the ListObject pointed at by lobj1 is indeed a fill object (step 502). If it is not a fill object, then lobj1 can not match lobj2 since lobj2 is known to be a fill object, so return MERGE_NONE (step 513). If lobj1 is a fill object, extract the number of points to the fill objects (step 503). If the number of points in each fill object do not match (step 504) then the objects can not be the same, so return MERGE_NONE (step 513).

Also as the compare_fill_objects function can not compute a fuzzy match, a MERGE_NONE is returned (step 513) unless an exact match was requested in the test_type (step 505).

At step 506, the loop to search for an exact match is started since it is know that lobj1 points to a fill object, the two fill objects have the same number of points in their outline, and that an exact match was requested.

At step 506 the vertices index, idx, is set to zero to start comparing the vertices on nfill1 and nfill2 one at a time to determine if the outlines in each fill object are equivalent. The loop terminates if the vertices index, idx, has been incremented until it is equivalent to the number of points in the outline. If so, then return MERGE_EXACT since it is know that the outlines match (step 507→514).

When idx is less than the number of points in the outline (step 507), the compare_fill objects function extracts the x values of the idx'th vertex from both nfill1 and nfill2 and assign them to v1 and v2 respectively (step 508).

If v1 is not equal to v2, then the outline in the fill object pointed at by nfill1 does not match the fill object pointed at by nfill2 since the x values of the two vertices at the idx'th vertex do not match. MERGE_NONE is returned in this case (step 508→509→515).

Next the y values of the idx'th vertex are extracted from both nfill1 and nfill2 and assigned to v1 and v2 respectively (step 510).

If v1 is not equal to v2, then the outline in the fill object pointed at by nfill1 does not match the fill object pointed at by nfill2 since the Y values of the two vertices at the idx'th vertex do not match. MERGE_NONE is returned in this case (step 510→511→515).

When the vertices match (step 508→509→510→511→512), idx is incremented by (step 512) and loop back to the head of the loop to look at the next vertex (step 507), until all vertices have been processed, resulting in a return of MERGE_EXACT (step 514) if all vertices are found to match.

The Order Function

In the Merge function, when a matching ListObject was pointed at by a LinkObject that was located between the start of a band, start_ptr[band], and the end pointer of the band, end_ptr[band] it was determined that the LinkObject, and the ListObject accordingly, was out of order relative to the z-order of the ListObjects as they are defined in an equivalent composite job.

Accordingly, the ListObject that was found out of order is moved to just after the ListObject pointed at by the LinkObject identified by end_ptr[band]. This ordering is achieved by the Order Function, or reorder_dl_objects function, as called in the Merge Function at step 356, FIG. 7, and described in FIG. 10.

In addition in a preferred embodiment of the present invention the Order function also moves other LinkObjects between the matching LinkObject and the end pointer, page→end_ptr[band], which have been determined to be out of order. Even though it would be simple to just move the one LinkObject that is out of order, the result of just moving the out of order matching ListObject, but moving its LinkObject, could leave other LinkObjects, and hence ListObjects, in that band out of order. Furthermore, a preferred embodiment of the present invention present invention is designed so that LinkObjects between the out of order object and the end pointer, end_ptr[band] that point at ListObjects that are in the current separation color being processed are not be moved since these ListObject were previously processed in the current separation and hence were properly positioned in the z-order at that time.

In a preferred embodiment of the present invention a bit mask is used to represent the combinations of the CMYK separation colors, with bit 0 being cyan, bit 1 being magenta, bit 2 being yellow, and bit 3 being black.

Figure 11:
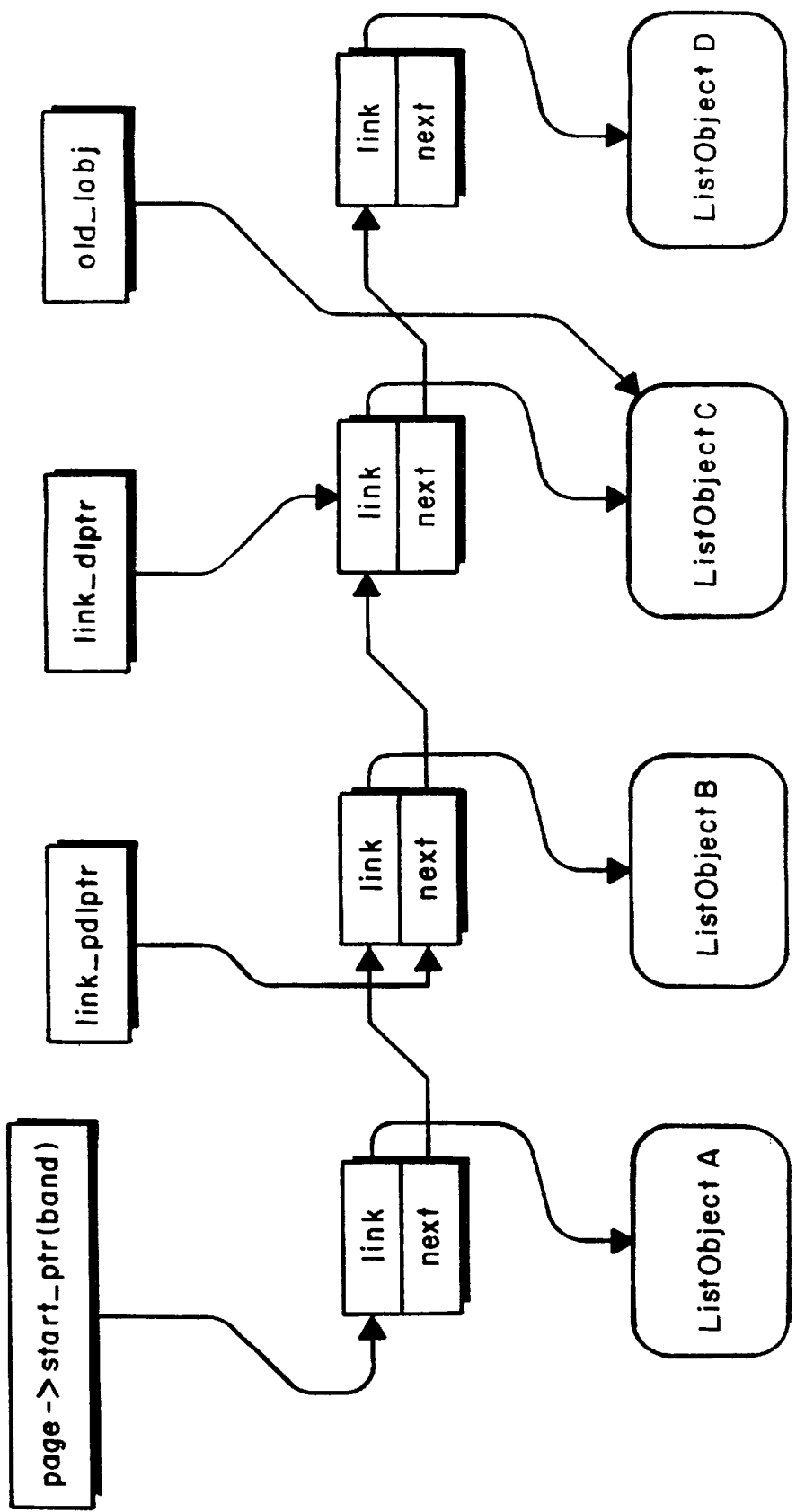
FIG. 11 is diagram representing the pointers link_dlptr and link_pdlptr as used in an Order function used in a Merge function in a preferred embodiment of the invention.

The first part of the Order function, or reorder_dl_objects, is to find the LinkObject that points at the LinkObject that points at the ListObject that is out of order. To achieve this two pointers are used, link_dlptr which points at a LinkObject, and link_pdlptr which points at the address of the next of the LinkObject that points to the LinkObject, pointed at by link_dlptr. FIG. 11 illustrates the position of the pointers link_dlptr and link_pdlptr in relation to one another with regards to the LinkObjects within a band.

The Order function initialize link_dlptr and link_pdlptr to point at the first LinkObject in the band start_ptr_[band] (step 401). The Order function checks if link_dlptr is nil (step 402) and if so returns to the Merge function since the out-of-order ListObject (old_lobj) is not found on this band (step 412).

Next it checks to see if the link of link_dlptr points at old_lobj (step 403). If not, then the pointers, link_dlptr and link_pdlptr are moved to the next LinkObject in the band (step 413) by updating link_pdlptr to point to the address of the next pointer that is pointing to the LinkObject that link dlptr is currently pointing at, and setting link dlptr to the LinkObject pointed at by the next of the LinkObject that link dlptr is currently pointing at, and continuing the loop at step 402.

At step 404, link_dlptr points to the LinkObject in the band that points at the out-of-order ListObject, old_lobj, and link_pdlptr points at the address of either the previous LinkObject's next pointer, or the address of the start pointer for this band, start_ptr_[band]. Next the end dlptr pointer is set to the end_ptr[band] and next_dlptr to the same value, and the base_separation_mask is derived from the current value of sep_index (step 404). The objects found to be moved are placed after next_dlptr, and for each one that is moved, next_dlptr is moved forward to point at it.

The initial value of the color_mask is extracted from old_lobj and the base separation color removed (step 405).

Next link_dlptr is compared to end_dlptr (step 406), and if they are the same, then return to the Merge function (step 414) since we have inspected and moved all the out of order LinkObjects. If not, then the color variable new_mask is set to the color mask extracted from the ListObject pointed at by the link of the LinkObject pointed at by link_dlptr (step 407).

Then the link of link dlptr is compared to old_lobj (step 408) and if they are the same the LinkObject is moved (commencing at step 415).

If the ListObject pointed at by link_dlptr→link is not the matching ListObject that is out of order, old_lobj (step 408), then check if the new_mask has common colors with color_mask (step 409). If it does have any common colors with the color_mask check that it does not have the color of the current separation (step 410) since then this ListObject was previously seen in this separation and properly positioned. In step 410, if it does not have the color of the current separation, the LinkObject in the band that points to this ListObject is moved since it has a common color with color_mask.

If either the ListObject does not have a common color with old_lobj (step 409), or if the object did have a common color, but it also had color in the current separation (step 410), link_pdlptr and link_dlptr are moved to their next position (step 411) and the loop at step 406 recommenced.

At step 415 the Order function is moving either the out of order LinkObject associated to the matching ListObject, old_lobj, or if the LinkObject points to a ListObject that has a common color with color_mask but not a common color with the current separation. The LinkObject is moved from its current position (link_dlptr) to the position after the LinkObject pointed at by next_dlptr (step 415).

The ordering process in a preferred embodiment of the present invention is commencing at step 415 has two parts, first the LinkObject is removed from the band between the start and end pointers (*link_pdlptr=link_dlptr→next), then spliced into the list at next_dlptr (link_dlptr→next= next_dlptr→next; next_dlptr→next=link_dlptr).

After moving the LinkObject, the LinkObject is checked to see if it points to old_lobj (step 416), and if so, end_ptr_[band] is moved to point to this LinkObject (step 418) since the end pointer in the band always tracks the last LinkObject that points to the ListObject that was either been inserted or merged into the band. If the LinkObject that was just moved does not point to old_lobj then it is known that the corresponding ListObject had a common color with old_lobj and it did not have any color in the base separation. Accordingly, the color information about the ListObject identified by this moved LinkObject need to be tracked, and the color_mask needs to updated (step 417) to include any new separation colors not previously encountered. This updating of the color_mask is performed because all the colors of any out of order ListObject need to be used when finding a following out of order ListObject. For example, if a red ListObject was found to be out of order in the yellow separation, then any ListObjects that have magenta, but not yellow, that were between the red ListObject and the object pointed at by the link of end_ptr[band] have to be ordered to ensure that there order relative to the red ListObject remains the same. Furthermore, if one of these ListObjects also contains cyan then any other ListObject between the ListObject containing cyan and the link of end_ptr[band] that also contains cyan will be moved to maintain the relative order between the cyan containing ListObjects.

Accordingly, as this process repeats, the common color from all of the out of order ListObjects is maintained in color_mask. Once either the color_mask has been updated (step 417), or the end pointer updated (step 418) the next dlptr is set to the LinkObject just moved (step 419) so the next LinkObject that is moved will be placed after the previous LinkObject moved, and also link_dlptr is updated to the LinkObject that followed it (which is pointed at by *link_pdlptr which was updated when the object was moved in Step 415). After updating next dlptr and link_dlptr the loop is recommenced at step 406 and repeated until link_dlptr is the same as end_dlptr, when the Order function terminates (step 414) and returns to the Merge function.

What is claimed is:

1. A method for constructing display lists of objects from input objects described in page description language separation files which represent the combination of said input objects, comprising:

(a) reading a plurality of input objects described in a plurality of page description language separation files which represent the combination of said plurality of input objects, each of said plurality of input objects being an object with color in a single separation;

(b) comparing one of said plurality of input objects against a display list of objects;

(c) determining if said one of said plurality of input objects matches an equivalent spatial object in said display list;

d) updating said equivalent spatial object with color data from said one of said plurality of input objects in response to a match there between;

e) inserting said one of said plurality of input objects into said display list in response to said one of said plurality input objects not matching any equivalent spatial object;

f) repeating b) to e) for all of said input objects.

2. The method of claim 1 wherein said updating includes determining that a temporal order of said display list does not match an order of input objects in said separation.

3. The method of claim 2 wherein said updating includes placing said matched object in said display list such that the temporal order of said display list is consistent with said order of said one of said input objects in the current one of a plurality of separations.

4. The method of claim 2 wherein said updating includes relocating a plurality of objects in said display list such that the temporal order of said display list is consistent with an intermediate ordering of said plurality of input objects.

5. The method of claim 1 wherein said one of said input objects is of the rectangle type.

6. The method of claim 1 wherein said one of said input objects is of the fill type.

7. The method of claim 4 wherein said display list is a plurality of pointers with each pointer associated to a corresponding input object.

8. The method of claim 7 wherein said temporal order of said display list is the order of the plurality of pointers.

9. Apparatus for combining input objects described in page description language separation files to print a color image which represents said input objects, comprising:

a) an access medium which stores and transmits a plurality of page description language separation files containing a plurality of input objects, each of said plurality of input objects being an object with color in a single separation;

b) a general purpose computer containing random access memory (RAM) and a processor operatively coupled to access said access medium and operative to:

i) compare one of said plurality of input objects against a display list of objects;

ii) determine if said one of said plurality of inputs object matches an equivalent spatial object in said display list;

iii) update said equivalent spatial object with color data from said one of said plurality of input objects in response to a match there between;

iv) insert said one of said plurality of input objects into said display list in response to said one of said plurality of input objects not matching any equivalent spatial object;

v) repeat i) to iv) for all of said plurality of input objects.

c) a color proofing system operatively coupled to said general purpose computer and adapted to produce said color image.

10. Apparatus of claim 9 wherein said general purpose computer is further adapted to determine that a temporal order of said display list does not match an order of input objects in said separation.

11. Apparatus of claim 10 wherein said general purpose computer is further adapted to place said matched object in said display list such that the temporal order of said display list is consistent with said order of said one of said input objects in the current one of a plurality of separations.

12. Apparatus of claim 10 wherein said general purpose computer is further adapted to relocate a plurality of objects in said display list such that the temporal order of said display list is consistent with an intermediate ordering of said plurality of the input objects.

13. The apparatus of claim 12 wherein said display list is a plurality of pointers with each pointer pointing to the RAM address of a corresponding input object.

14. The apparatus of claim 13 wherein said temporal order of said display list is the temporal order of said plurality of pointers.

* * * * *